United States Patent [19]
Wu

[11] Patent Number: 5,655,122
[45] Date of Patent: Aug. 5, 1997

[54] OPTIMIZING COMPILER WITH STATIC PREDICTION OF BRANCH PROBABILITY, BRANCH FREQUENCY AND FUNCTION FREQUENCY

[75] Inventor: Youfeng Wu, Aloha, Oreg.

[73] Assignee: Sequent Computer Systems, Inc., Beaverton, Oreg.

[21] Appl. No.: 417,219

[22] Filed: Apr. 5, 1995

[51] Int. Cl.$^6$ .................................................. G06F 9/45
[52] U.S. Cl. ......................... 395/705; 395/586; 395/707; 395/709
[58] Field of Search ........................... 395/700, 183.11, 395/183.14, 705, 709, 707, 586

[56] References Cited

U.S. PATENT DOCUMENTS

| | | | |
|---|---|---|---|
| 5,170,465 | 12/1992 | McKeeman et al. | 395/700 |
| 5,457,799 | 10/1995 | Srivastava | 395/700 |

OTHER PUBLICATIONS

Ball, Thomas, and James R. Larus, "Optimally Profiling and Tracing Programs," *Conference Record of the Nineteenth ACM Symposium on Principles of Programming Languages* (Jan., 1992), pp. 59–70.

Ball, Thomas, and James R. Larus, "Branch Prediction for Free," *Proceedings of ACM SIGPLAN'93 Conference on Programming Language Design and Implementation* (Jun., 1993), pp. 300–313.

Forman, Ira R., "On the Time Overhead of Counters and Traversal Markers," *Proceedings of the 15th International Conference on Software Engineering*, Mar. 1981, pp. 164–169.

Graham, S.L., P.B. Kessler, and M.K. McKusick, "An Execution Profiler for Modular Programs," *Software—Practice and Experience*, 13, pp. 671–685 (1983).

Hall, M.W. and Ken Kennedy, "Efficient Call Graph Analysis," *ACM Letters on Programming Languages and Systems*, vol. 1, No. 3, Sep. 1992, pp. 227–242.

Hickey, T. and Choen, J., "Automating Program Analysis," *JACM*, 35, 1, 1988, pp. 185–220.

Ramamoorthy, C.V., "Discrete Markov Analysis of Computer Programs," In ACM Proceedings 20th National Conference, pp. 386–391, Aug. 1965.

Shafer, G, *A Mathematical Theory of Evidence*, Princeton, NJ: Princeton University Press, 1976.

Wagner, T.A., V. Maverick, S.L. Graham, and M.A. Harrison, "Accurate Static Estimators for Program Optimization," To appear: *SIGPLAN PLDI '94*, Jun. 1994.

Wall, David W., "Predicting Program Behavior Using Real or Estimated Profiles," *Proceedings of ACM SIGPLAN '91 Conference on Programming Language Design and Implementation*. Toronto, Ontario, Canada (Jun., 1991), pp. 59–70.

*Primary Examiner*—Alvin E. Oberley
*Assistant Examiner*—Kakali Chaki
*Attorney, Agent, or Firm*—Klarquist Sparkman Campbell Leigh & Whinston, LLP

[57] ABSTRACT

A compiler and method for optimizing a program based on branch probabilities, branch frequencies and function frequencies. A number of algorithms executed by the compiler determine statically from the program code the probabilities that branches with the program are taken and how often the branches are taken. With this information, the compiler arranges the object code in memory to improve execution of the program. The frequency of functions within the code may be determined from the branch probability and branch frequency information. The compiler uses the function frequency information to arrange the functions in a desirable order, such as storing function pairs with the highest global call frequencies on the same memory page. This minimizes the number of calls to functions that are stored on disk and thus improves the speed of execution of the program.

26 Claims, 13 Drawing Sheets

OPTIMIZING COMPILER WITH STATIC PREDICTION OF BRANCH PROBABILITY, BRANCH FREQUENCY AND FUNCTION FREQUENCY

FIELD OF THE INVENTION

This invention relates to computer language translators such as compilers that translate source code into object code. More particularly, this invention relates to compilers which optimize the object code they generate by applying code-improving transformations.

BACKGROUND OF THE INVENTION

A compiler is a computer program that reads a program written in one language—the source language—and translates it into an equivalent program in another language—the target, or object, language. Common source languages are human readable languages such as FORTRAN, BASIC and C. Programs written in a source language are comprised of source code that consists of a series of instructions. Object languages are comprised of assembly language or machine language for a target machine such as an Intel microprocessor-based computer.

There are two parts to a compiler: analysis and synthesis. The analysis part breaks up the source program into constituent pieces and creates an intermediate code representation of the source program. The synthesis part constructs the equivalent object program from the intermediate code.

The analysis part of a compiler includes lexical, syntax and semantic analysis and intermediate code generation. This part is often referred to as the "front end" of a compiler because the part depends primarily on the source language and is largely independent of the target machine. Briefly, lexical analysis consists of reading the characters of the source program and grouping them into a stream of tokens. Each token represents a logically cohesive sequence of characters. Syntax analysis then groups, or parses, the tokens of the source program into grammatical phrases that are used by the compiler to synthesize output. Semantic analysis then checks the parsed source program for semantic errors. After performing syntax and semantic analysis, the compiler generates intermediate code from the parsed source program. The intermediate code is written in an intermediate language and consists of a series of instructions.

The synthesis part of a compiler typically includes code optimization and object code generation. This part is often referred to as the "back end" of the compiler because the code generated depends on the target machine language, not the source language. Code optimization attempts to improve the intermediate code for the program so that faster running machine code will result. Object code generation then generates object code from the improved intermediate code by, among other things, translating each intermediate code instruction into a sequence of machine instructions that perform the same task.

The use of instruction-level parallel processing in newer CPUs such as the Intel Pentium™ microprocessor has increased the need to optimize the order of instructions. With parallel processing, following instructions are executed in parallel with preceding instructions. However, if the preceding instructions include a branch, then execution of the following instructions is unnecessary if the preceding instructions branch away from the following instructions. The CPU instead must execute the instructions that the branch leads to. This circumstance is referred to as speculative instruction execution, since it is uncertain whether the parallel-executing instructions actually need to be executed. To reduce this uncertainty, compilers attempt to assess a program's likely instruction path through the program's various branches. To select a profitable optimization, a compiler must first predict how often portions of a program execute. Once the more frequently executed portions are identified, any of a number of well known optimizations can be applied to these portions. These optimizations include rearranging the sequence of object code so that the more frequently executed portions follow each other and can be executed in parallel.

Another reason for optimizing the order of instructions is to reduce cache misses in computers that utilize cache memory between the CPU and main memory. Instructions may be arranged so that those most likely to be executed sequentially are stored in the same cache line or block. Thus when a cache line is accessed for an instruction, the instructions most likely to follow are also immediately available to the CPU.

Determining the more frequently executed portions of a program is often done through a process known as profiling. Dynamic profiling consists of compiling and then executing a program to collect the execution frequencies of the program portions. Most profiles result from dynamically counting events during a program's execution. Based on these counts, a compiler can identify the frequently executed code and optimize it with the benefit of this information. However, dynamic profiling has a number of drawbacks. First, obtaining a profile of each program to be compiled requires compiling and executing the program twice, once to obtain the program's profile and once to optimize the code with the benefit of the profile information. Second, it is often impractical to profile real time and reactive systems. Third, optimization based on dynamic profiling is not automatic, but requires programmer intervention to provide the input data and run the program in the optimizing process. End users are untrained in dynamic profiling and in using the profiling information to optimize programs they write.

An alternative is static profiling, in which a compiler estimates relative frequencies (not absolute counts) through a static analysis of the program's code. Static analysis relies upon heuristics (commonly observed program behaviors) for predicting what portions of a program most frequently execute. Heuristics are derived through observation of programs and typically are given as a probability, e.g., a chance that a branch of a certain kind will be taken by a program. Since static analysis does not require executing the program to obtain the profile information, the drawbacks of dynamic profiling are avoided.

A prime example of present static profiling techniques is described by Thomas Ball and James Larus in a 1993 paper entitled "Branch Prediction for Free," which is hereby incorporated by reference. In their paper, Ball and Larus describe a number of heuristics they may apply to branches in a program's code to predict whether the branch will be taken. These heuristics include, for example, a prediction (yes or no) that a comparison of a pointer against a null in an If statement will fail. Based on these binary branch predictions, a compiler can estimate what portions of the program are most likely to be executed.

Typically, several heuristics apply to a branch. Ball and Larus predict a branch's outcome with the first heuristic—from a pre-computed, static priority ordering—that applies to a branch and disregard the other heuristics. This approach works well for branch prediction, which simply produces a yes or no. However, it ignores valuable statistical information. Each heuristic is determined from empirical data, and associated with each heuristic is a statistical probability that the branch will be taken. It is this probability that provides the basis for the binary prediction. For example, the heuristic mentioned above empirically may have a 60% chance of being correct, and thus the prediction is that the branch will occur since the comparison fails most of the time. But this statistical information is not used beyond determining the prediction.

The primary drawback of static profiling techniques to date is their inaccuracy in predicting program behavior. The approach suggested by Bell and Larus as well as other static profiling approaches suggested by others are not as accurate as dynamic profiling.

An object of the invention, therefore, is to provide an improved static profiling method for determining frequently executed portions of a program. Another object of the invention is to provide an optimizing compiler that employs this method in optimizing the compilation of source code into object code.

SUMMARY OF THE INVENTION

In accordance with the invention, a method of compiling a computer program utilizes the probabilities from a number of applicable heuristics to determine what branches of a program are most likely to be taken. In one aspect of the invention, a table of probabilities associated with a plurality of heuristic predictions is stored. The compiler generates intermediate code, stores it, partitions it into basic blocks, and then stores the basic blocks in a data structure that includes branches to other basic blocks. For the branches, the heuristic predictions that apply to a branch are determined. The probabilities associated with the heuristics that apply to a branch are combined to compute a probability of the branch being taken by the program. Object code is then generated and stored in an order based on the branch probabilities.

In another aspect of the invention, branch probabilities are used for computing branch frequencies and block frequencies. The branch frequencies, derived from the branch probabilities, may then be a more direct basis for storing the object code in a given order to optimize program execution.

In another aspect of the invention, function invocation frequencies and function call frequencies are computed and combined to obtain global call frequencies for calling and called function pairs f,g. These global call frequencies are then used by the compiler to order and store functions within multiple object files to improve the likelihood that a calling function and its called function are located within a same virtual memory page. This reduces the need for disk access, further increasing the speed of program execution.

The foregoing and other objects, features, and advantages of the invention will become more apparent from the following detailed description of a preferred embodiment and the accompanying drawings.

DETAILED DESCRIPTION OF A PREFERRED EMBODIMENT

Figure 1:
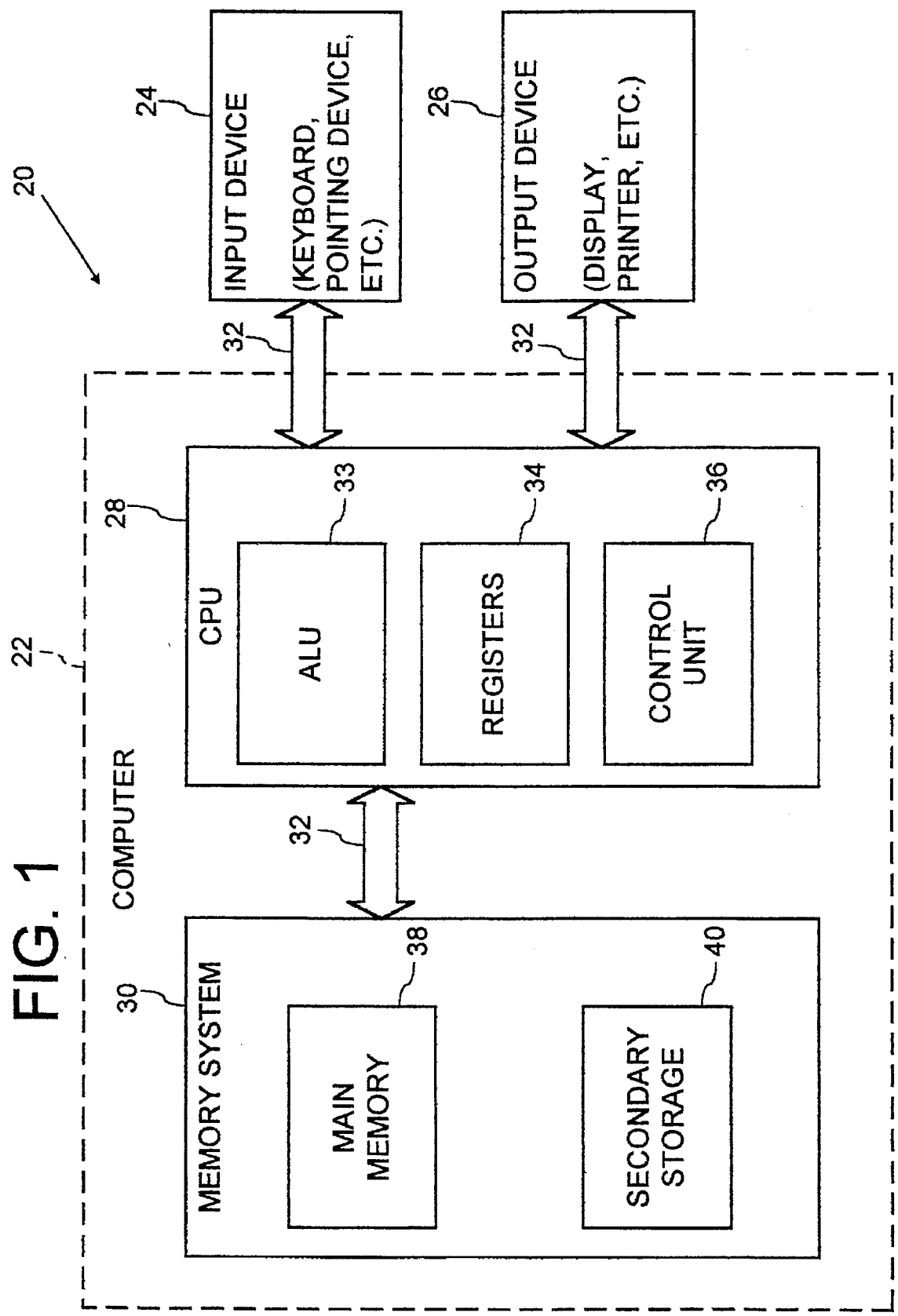
FIG. 1 is a block diagram of a computer system that may be used to implement a method and apparatus embodying the invention.

FIG. 1 is a block diagram of a computer system 20 which is used to implement a method and apparatus embodying the invention. Computer system 20 includes as its basic elements a computer 22, input device 24 and output device 26.

Computer 22 generally includes a central processing unit (CPU) 28 and a memory system 30 that communicate through a bus structure 32. CPU 28 includes an arithmetic logic unit (ALU) 33 for performing computations, registers 34 for temporary storage of data and instructions and a control unit 36 for controlling the operation of computer system 20 in response to instructions from a computer program such as an application or an operating system.

Memory system 30 generally includes high-speed main memory 38 in the form of a medium such as random access memory (RAM) and read only memory (ROM) semiconductor devices and secondary storage 40 in the form of a medium such as floppy disks, hard disks, tape, CD-ROM, etc. and other devices that use optical or magnetic recording material. Main memory 38 stores programs such as a computer's operating system and currently running application programs. Main memory 38 also includes video display memory for displaying images through a display device.

Input device 24 and output device 26 are typically peripheral devices connected by bus structure 32 to computer 22. Input device 24 may be a keyboard, modem, pointing device, pen, or other device for providing input data to the computer. Output device 26 may be a display device, printer, sound device or other device for providing output data from the computer.

It should be understood that FIG. 1 is a block diagram illustrating the basic elements of a computer system; the figure is not intended to illustrate a specific architecture for a computer system 20. For example, no particular bus structure is shown because various bus structures known in the field of computer design may be used to interconnect the elements of the computer system in a number of ways, as desired. CPU 28 may be comprised of a discrete ALU 33, registers 34 and control unit 36 or may be a single device in which these parts of the CPU are integrated together, such as in a microprocessor. Moreover, the number and arrangement of the elements of the computer system may be varied from what is shown and described in ways known in the art (i.e., multiple CPUs, client-server systems, computer networks, etc.).

Figure 2:
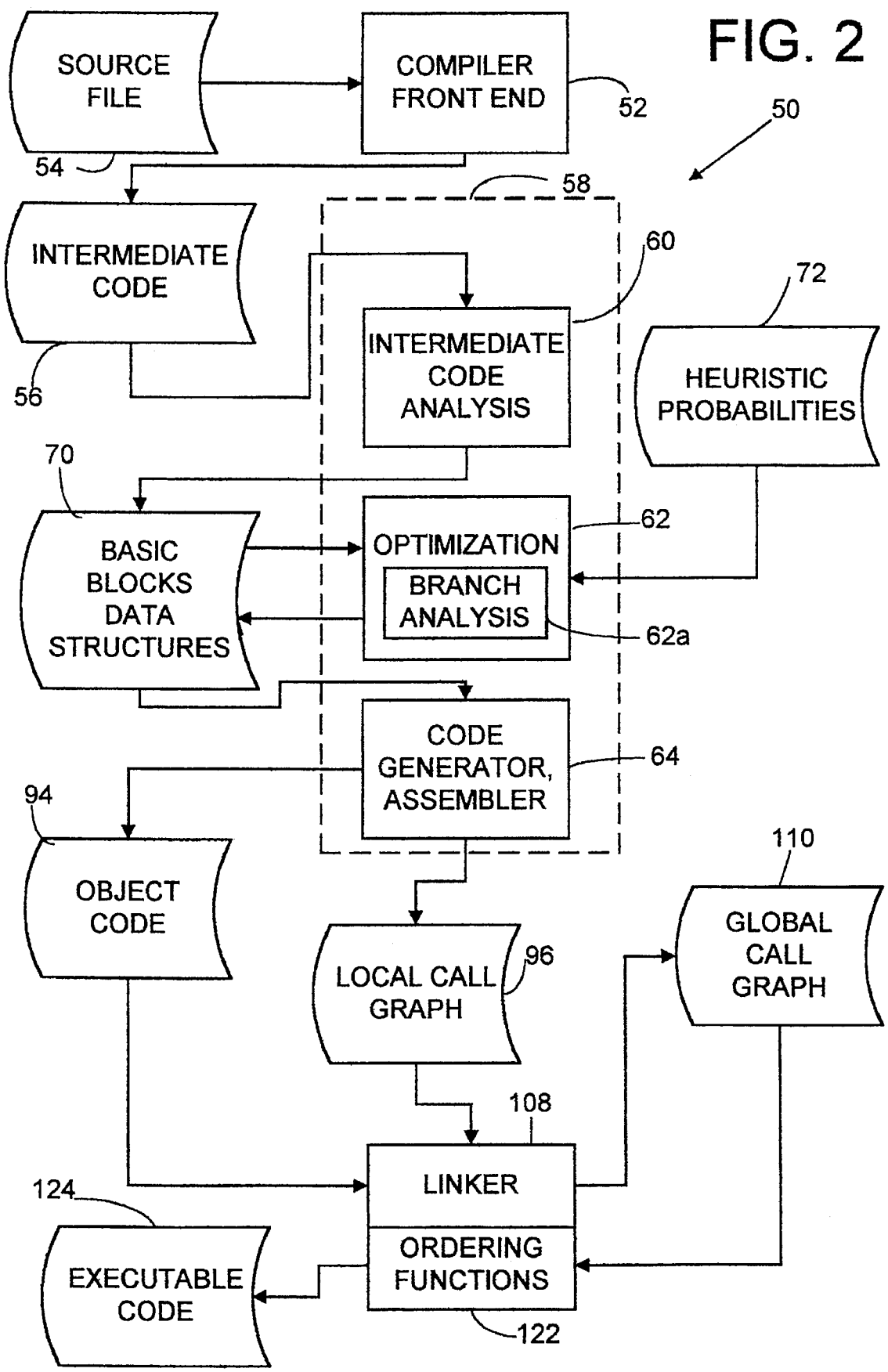
FIG. 2 is a data flow diagram of a compiler embodying the invention.

FIG. 2 is a data flow diagram of a compiler 50 embodying the invention. The compiler includes a front end 52 that receives as input a source file 54 which includes source code written in a high level language such as C. The front end of the compiler is conventional in nature and may include, for example, a lexical analyzer, a syntax analyzer, a semantic analyzer. The front end 52 also includes a code generator that generates intermediate code from the source code based on these analyses. This intermediate code is then stoed in a file 56 in memory system 30. The file 56 is preferably permanently stored in some type of secondary storage 40 and copied into main memory 38 as needed for processing. However, storage in secondary storage 40 is not required.

A back end of the compiler 50 is indicated by dashed block 58. The compiler back end 58 includes an intermediate code analysis portion 60, an optimization portion 62, and a code generator portion 64. The code analysis portion 60 analyzes the intermediate code and partitions it into basic blocks. Typically, each function or procedure in the intermediate code is represented by a group of related basic blocks. As understood in the art, a basic block is a sequence of consecutive statements in which flow of control enters at the beginning and leaves at the end without branching except at the end. For example, a block of assignment statements is a basic block because there is no possibility of branching in the middle of the block. On the other hand, a block of intermediate code statements that includes a branch in the middle of the block (generated perhaps by an IF statement in the source code) is not a basic block because of the possibility of branching from the middle of the block. The basic blocks of intermediate code are then stored by compiler 50 into basic block data structures 70.

Figure 3:
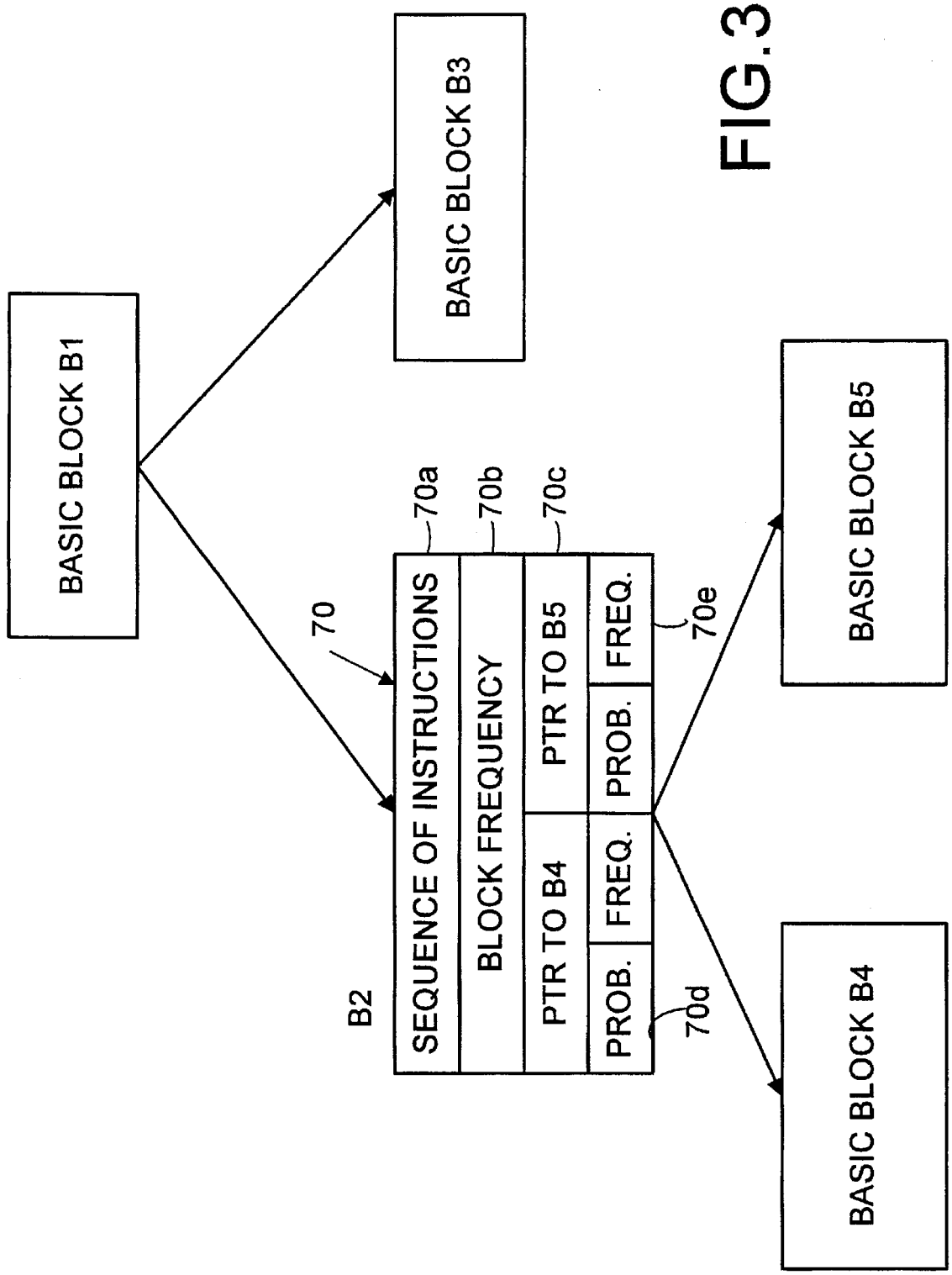
FIG. 3 is a control flow graph of a procedure, including a diagram of a basic block data structure according to the invention.

FIG. 3 is a control flow graph of a procedure (i.e., a function) that includes a diagram of a basic block data structure 70. The graph is comprised of a group of nodes, which are the basic blocks of a function, and edges, which are the branches. Node B1 is the initial node of the function; it is the block whose leader is the first statement of the function. There are edges from block B1 to blocks B2 and B3, indicating branches to these following blocks. Block B2 is a successor of block B1, and B1 is a predecessor to B2. Similarly, blocks B4 and B5 are successors to B2.

As stored in the memory system 30, data structure 70 includes a number of relevant fields for holding data elements and their attributes. These include a field 70a for storing the sequence of intermediate code instructions that comprise the basic block. A field 70b contains a value for the block frequency, which, as will be explained, is the number of times a basic block typically executes within the procedure. Fields 70c contain pointers to other basic blocks. These pointers indicate the possible branches from the basic block to other basic blocks. For example, the data structure for block B2 includes in fields 70c pointers to blocks B4 and B5. Attributes for fields 70c include a branch probability value in a field 70d and branch frequency value in field 70e. The branch probability is an estimate of the likelihood that the branch will be taken. The branch frequency is the number of times the branch is taken, and is the product of the branch probability and block frequency.

Heuristic Predictions

Returning to FIG. 2, the optimization portion 62 of compiler back end 58 performs a number of conventional optimizations. However, it also includes branch analysis 62a for performing novel optimizations in accordance with the invention. The branch analysis is applied to the basic block data structures to determine the block and branch probabilities and frequencies described above. As part of the branch analysis, compiler back end 58 accesses a look up table 72 in memory system 30 which contains probabilities associated with a plurality of heuristic predictions. These probabilities are derived from empirical data from executed computer programs. While various groups of heuristics may be employed in compiler 50, the following heuristics are presently used:

Loop branch heuristic (LBH). Predict as taken an edge back to a loop's head. Predict as not taken an edge exiting a loop.

Pointer heuristic (PH). Predict that a comparison of a pointer against null or of two pointers will fail.

Opcode heuristic (OH). Predict that a comparison of an integer for less than zero, less than or equal to zero, or equal to a constant, will fail.

Guard heuristic (GH). Predict that a comparison in which a register is an operand, the register is used before being defined in a successor block, and the successor block does not post-dominate will reach the successor block.

Loop exit heuristic (LEH). Predict that a comparison in a loop in which no successor is a loop head will not exit the loop.

Loop header heuristic (LHH). Predict a successor that is a loop header or a loop pre-header and does not post-dominate will be taken.

Call heuristic (CH). Predict a successor that contains a call and does not post-dominate will not be taken.

Store heuristic (SH). Predict a successor that contains a store instruction and does not post-dominate will not be taken.

Return heuristic (RH). Predict a successor that contains a return will not be taken.

Table 1 below shows the contents of look up table 72 of FIG. 2:

TABLE 1

| Heuristics | Heuristic Probability |
|---|---|
| Loop branch (LBH) | 88% |
| Pointer (PH) | 60% |
| Opcode (OH) | 84% |
| Guard (GH) | 62% |
| LOOP exit (LEH) | 80% |
| Loop header (LHH) | 75% |
| Call (CH) | 78% |
| Store (SH) | 55% |
| Return (RH) | 72% |

Other heuristics that may be used are the following:

LoopIndex heuristic (LIH). Predict that a comparison of an integer value equal to a loop index variable will fail.

Pointer Guard heuristic (PGH). Predict that a comparison in which a pointer is an operand and the pointer is used before being defined in a successor block, and the successor block does not post-dominate will reach the successor block. This heuristic overrides Pointer and Guard heuristics.

OPvar heuristic (OPH). Predict the comparison of two variables for equal will fail.

OPMax heuristic (OPMXH). Predict that a comparison of a variable greater than or greater or equal to a variable with a name that contains one of the following patterns will fail: max, most, largest, biggest, size, upper, length.

OPMin heuristic (OPMNH). Predict that a comparison of a variable less than, or less than or equal to, a variable with a name that contains one of the following patterns will fail: min, least, smallest, low.

Abnormal heuristic (AH). Predict that a successor that contains a call to a function whose name contains one of the following patterns is not taken: warn, exit, abort, abend, aberr, quit, error, kill, fatal, longjmp. This heuristic overrides the Call heuristic.

Abort heuristic (ABH). Predict that the successor that contains a call to a function whose name is one of the following strings is not taken: exit, _exit, abort, abend, aberr, quit, error, perrot, kill, fatal, longjmp, siglongjm. This heuristic overrides Call and Abnormal heuristics.

Debug heuristic (DH). Predict that a comparison of a debug variable for none-zero will fail. A variable whose name contains one of the following patterns is a debug variable: error, debug, verbose, trace.

Errno heuristic (EH). Predict that a comparison of errno for non-zero will fail.

CMP heuristic (CMPH). Predict that a call to a function whose name contains one of the following patterns returns a non-zero value: cmp, compar.

Status heuristic (STH). Predict that a system call will return normal status.

Range heuristic (RGH). Predict that a check for a variable out of a range will fail.

When a heuristic predicts exactly one successor of a branch as taken, the heuristic applies to the branch. If a heuristic applies to a branch and the predicted taken branch is actually taken, the heuristic hits. The percentage of predictions that hit is the heuristic's hit rate. A hit can be treated as the successful outcome of a binary experiment. By repeating the experiment N times, M (M≦N) true outcomes and N–M false outcomes are obtained. If N is reasonably large, the hit ratio M/N approximates the probability of a successful outcome. A heuristic's hit rate is a good estimate of the probability that the predicted branch will be taken at run time. For example, if PH's hit rate is 60%, PH predicts that the branch will fail 60% of the time when heuristic PH applies to a branch.

Computing Branch Probabilities

Figure 4:
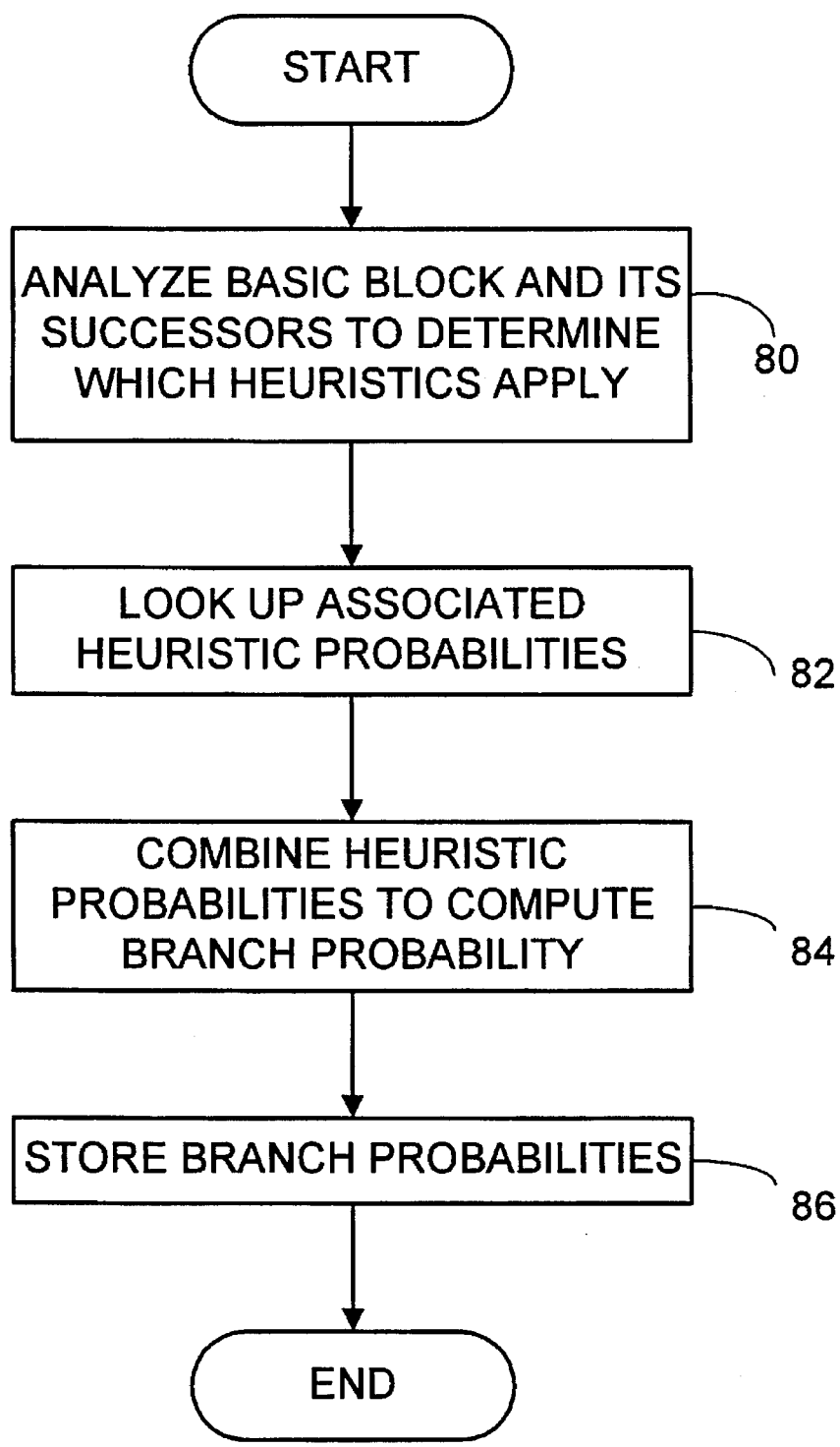
FIG. 4 is a flowchart showing the steps for computing branch probabilities from heuristic probabilities.

The compiler 50 computes branch probabilities from identified heuristic predictions using table 72 and basic blocks data structure 70. FIG. 4 is a flowchart that illustrates how this is done. The following steps are applied to the basic blocks in each function in the program being compiled. As an initial step, branch analysis 62a analyzes the sequence of instructions in field 70a of a basic block and its successor blocks data structures 70 to determine which heuristics apply to the branch (80). The applicable heuristics are then looked up in table 72 to determine their associated probabilities (82). If more than one heuristic prediction applies, the associated probabilities of the applicable heuristics are combined to compute a probability of the branch being taken by the program (84). (If only one heuristic prediction applies, its probability is stored as the branch probability). The computed branch probability is then stored in the basic block data structure field 70d. As will be explained, these branch probabilities may be used in a number of ways for optimizing the object code of the program. For example, the branch probabilities may be used as a basis for storing the object code in a desired order in a file so that the most frequently executed portion of the object code is stored together. This promotes the parallel execution of instructions in CPUs that have this capability.

The applicable heuristic probabilities may be combined in a number of ways. In the preferred embodiment, they are combined according to the following-described algorithm, which is derived from the Dempster-Shafer theory of evidence described in *A Mathematical Theory of Evidence*, Princeton University Press, 1976. This algorithm combines probability predictions of all applicable heuristics into a branch probability.

Combining heuristic probabilities from several heuristics produces a branch probability that is more accurate than if only one heuristic probability alone were used. For example, in the following code:

if ($i<0$) then $x=y$; else $\{x=1; \text{return;}\}$ both the OH and RH heuristics apply. OH suggests that the else-branch is taken, but RH claims that the then-branch is taken. The prior art approach of ordering heuristics and selecting the first resolves the conflict by ignoring RH. This reasonably predicts the else-branch, but it results in a 84% probability for this branch. The negative evidence from RH arguably should reduce the probability.

Dempster-Shafer theory provides a mathematical technique for combining values such as these heuristic probabilities into a meaningful prediction of the probability of an outcome. It starts from a basic probability in the range [0,1]. This value is the degree to which evidence supports a hypothesis. For branch probability estimation, the hypothesis is: "branch b is taken" or "a branch other than b is taken (b is not taken)." The evidence is that a heuristic predicts the branch. The basic probability is the heuristic probability.

If more than one heuristic supports or denies a hypothesis, Dempster-Shafer theory provides an elegant way to combine heuristic probabilities. Assume an event has a set of k exhaustive and mutually exclusive possible outcomes $A=\{A_1, A_2, \ldots, A_k\}$. Each subset of A has a corresponding hypothesis that the events in the subset occur. A piece of evidence assigns a value in [0, 1] to every hypothesis (subset of A), so the values for the evidence sum to 1. This value indicates the likelihood that the event occurs. The empty set is assigned 0. This assignment is called a basic probability assignment (denoted by function m). For example, a branch $b \rightarrow \{b_1, b_2, \ldots, b_k\}$ has k exhaustive and mutually exclusive outcomes $A=\{b_1, b_2, \ldots, b_k\}$. If a heuristic predicts the probability of taking $b_i$ is $\mu$ and the probability of not taking $b_i$ is $1-\mu$, the following basic probability assignment is obtained: $m_1(\{b_1\})=\mu$ and $m_1(A-\{b_i\})=1-\mu$. If another heuristic predicts the probability of taking $b_i$ is $v$, another basic probability assignment is obtained:

$$m_2(\{b_i\})=v \text{ and } m_2(A-\{b_i\})=1-v.$$

Let $m_1$, and $m_2$ be two basic probability assignments. The Dempster-Shafer algorithm computes a new combined assignment, denoted $m \oplus m_2$, that combines the evidence from both assignments. For a subset B of A:

$$m_1 \oplus m_2(B) = \frac{\Sigma m_1(X) m_2(Y)}{\Sigma m_1(U) m_2(W)}$$

where X and Y run over all subsets of A whose intersection is B and U and W are subsets of A with at least one element in common. To continue the example from above, when $b=b_i$ (i.e. the two heuristics predict the same outcome) only the subsets $\{b_i\}$ and $A-\{b_i\}$ may have non-zero basic probabilities because all other subsets, S, have $m_1(S)$ and $m_2(S)$ equal to zero. To find the combined basic probability, notice that $m_1(\{b_i\})m_1(\{b_i\})$ produces $\mu v$, and for all other subsets X and Y, if their intersection is $\{b_1\}$, then $m_1(X)m_2(Y)$ is zero. Furthermore, $m_1(A-\{b_i\}) \, m_2(A-\{b_i\})=(1-m)(1-\mu)$, so:

$$m_1 \oplus m_2(b_i) = \frac{\mu v}{\mu v + (1-\mu)(1-v)}$$

-continued $$m_1 \oplus m_2(A - \{b_i\}) = \frac{(1-\mu)(1-v)}{\mu v + (1-\mu)(1-v)}$$

In this case, $m_1 \oplus m_2(\{b_i\}) > m_1(\{b_i\})$ if and only if $m_2(\{b_i\}) > 0.5$ and $m_1 \oplus m_2(\{b_i\}) > m_2(\{b_i\})$ if and only if $m_1(\{b_i\}) > 0.5$. This shows that an estimation that $b_i$ occurs less than half of the time lowers the probability of another prediction of the same outcome.

Consider the case when $b_i \neq b_j$ (the heuristics predict different outcomes). If k=2, one has the same case as $b_j = b_i'$ by using $b_i' = A - \{b_i\}$. If 2<k:

$$m_1 \oplus m_2(\{b_i\}) = \frac{\mu(1-v)}{1-\mu v}$$

$$m_1 \oplus m_2(\{b_j\}) = \frac{v(1-\mu)}{1-\mu v}$$

$$m_1 \oplus m_2(\{b_i,b_j\}) = \frac{(1-\mu)(1-v)}{1-\mu v}$$

In this case, $m_1 \oplus m_2(\{b_1\}) > m_1(\{b_i\})$ if and only if $m_1(\{b_i\}) = 1$ or $0$. This shows that a contradictory prediction lowers the probability unless one prediction is certain (1 or 0).

As a concrete example, suppose $b \rightarrow \{b_1, b_2\}$ initially (in the absence of a prediction) has an equal probability of branching to $b_1$ and $b_2$ ($m_1(\{b_1\}) = m_1(\{b_2\}) = 0.5$). If a heuristic predicts that $b \rightarrow b_1$ occurs 70% of the time ($m_2(\{b_1\}) = 0.7$ and $m_2(\{b_2\}) = 0.3$), the combined probabilities are:

$$m_1 \oplus m_2(\{b_1\}) = \frac{0.5 \times 0.7}{0.5 \times 0.7 + 0.5 \times 0.3} = 0.7$$

$$m_1 \oplus m_2(\{b_2\}) = \frac{0.5 \times 0.3}{0.5 \times 0.7 + 0.5 \times 0.3} = 0.3$$

Now suppose another heuristic estimates that $b \rightarrow b1$ is taken 60% of the time ($m_3(\{b_1\}) = 0.6$ and $m_3(\{b_2\}) = 0.4$). The estimate then becomes:

$$m_1 \oplus m_2 \oplus m_3(\{b_1\}) = \frac{0.7 \times 0.6}{0.7 \times 0.6 + 0.3 \times 0.4} = 0.78$$

$$m_1 \oplus m_2 \oplus m_3(\{b_2\}) = \frac{0.3 \times 0.4}{0.7 \times 0.6 + 0.3 \times 0.4} = 0.22$$

The second heuristic increased the probability that $b_1$ is taken from 0.7 to 0.78. This process can be repeated, in any order, to incorporate other heuristics as the operator $\oplus$ is associative.

Table 2 below shows pseudocode that describes this algorithm as it is executed by the branch analysis 62a of compiler back end 58. The algorithm computes the probability for two-way branches by combining predictions from all applicable heuristics. For multiway (>2) branches, it assigns equal probability to each outcome since no heuristics predicts these branches. If heuristics are developed for multiway branches, the algorithm can use the general Dempster-Shafer algorithm to combine the basic branch probabilities.

A similar algorithm can also combine the probabilities from dynamic profiles. A common way to combine these profiles is to add counts for each branch, which weights a profile in proportion to its execution length. By first converting counts into predictions of branch probabilities, Dempster-Shafer theory can combine profiles without this bias.

TABLE 2

Input: Control-flow graph G for function. Each node is a basic block and an edge $b_i \rightarrow b_j$ represents a branch from block $b_i$ to $b_j$.
For each heuristic H, the predicted taken probability is taken_prob(H), and the not taken probability is not_taken_prob(H).

Output: Assignment of a branch probability prob($b_i \rightarrow b_j$) to each edge $b_i \rightarrow b_j$ in G.

Process:
foreach block b with n successors
        and m back edge successors (m ≤ n) do
    if n == then                          // No successors
        continue;
    else if b calls exit() then
        foreach successor s of b do
            prob(b→s) = 0.0;    // Never reach successors
    else if m > 0 and m < n then
        // Both back edges and exit edges
        foreach back edge successor s of b do
            prob(b→s) = taken_prob(LBH) / m;
        foreach exit edge successor s of b do
            prob(b→s) = not_taken_prob(LBH) / (n − m);
    else if m > 0 or n ≠ 2 then
        // Only back edges, or not a 2-way branch
        foreach successor s of b do
            prob(b→s) = 1.0 / n;
    else                                  // None of the above
        let $s_1$ and $s_2$ be the successors of b
        prob(b→$s_1$) = prob(b→$s_2$) = 0.5
        foreach heuristic H that applies do
            Assume H predicts (b→$s_1$) taken,
                and (b→$s_2$) not taken
            d = prob(b→$s_1$) × taken_prob(H)
                + prob(b→$s_2$) × not_taken prob(H);
            prob(b→$s_1$) = prob(b→$s_1$) × taken_prob(H)    / d;
            prob(b→$s_2$) = prob(b→$s_2$) × not_taken_prob(H) /d;

Computing Block Frequencies and Branch Frequencies

There may be a number of ways that object code may be optimized based on the determined branch probabilities. In the preferred embodiment, the branch probabilities are the basis for computing block frequencies and branch frequencies. After computing branch probabilities, compiler 50 calculates intra-procedural (or local) basic block and control flow graph (CFG) edge frequencies by propagating branch probabilities over a single procedure's control-flow graph. The frequency of a branch $b_1 \rightarrow b_i$, is the frequency of block $b_i$ times the branch probability of $b_i \rightarrow b_j$. The frequency of block $b_i$ is the sum of the frequencies of incoming edges. Let bfreq($b_i$) be the frequency of block $b_i$ and freq($b_i \rightarrow b_j$) be the edge frequency of $b_i \rightarrow b_j$. Assume pred(b) is the set of predecessor blocks of $b_1$. The following flow equations state this relation precisely:

| | |
|---|---|
| bfreq($b_i$) | = 1 (if $b_i$ is the entry block) |
| bfreq($b_i$) | = $\Sigma$freq($b_p \rightarrow b_i$)(otherwise) |
| | $b_p \in$ pred($b_i$) |
| freq($b_i \rightarrow b_i$) | = bfreq($b_i$) × prob($b_i \rightarrow b_i$) |

Figure 5C:
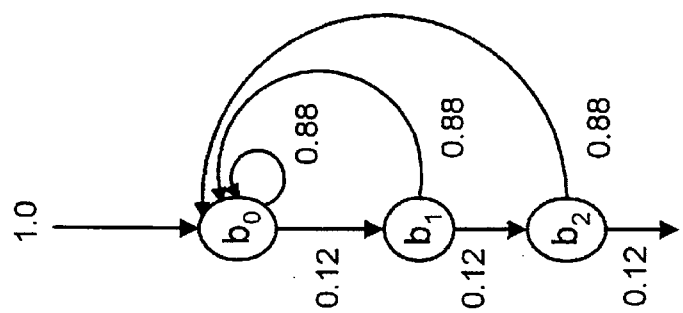
FIGS. 5A–C are example control flow graphs for computing block and branch frequencies.

For a flow graph without cycles, these equations can be solved top-down in a single pass. When a graph contains cycles, these equations are mutually recursive and must be solved by finding a least fixed point. FIGS. 5A–C and 6 are graph representations of several procedures' basic blocks. Referring to FIG. 5A, consider first a structured flow graph in which a single loop head dominates a loop body (this could be a single loop or nested loops that share the same head). In the flow graph, block $b_0$ is the loop head, in_freq ($b_0$) is the total frequency of the edges (excluding the back edges) entering $b_0$, and blocks $b_1, b_2, \ldots, b_k$ contain back edges leading to $b_0$. Since $b_0$ is the only entry to the loop, one can propagate bfreq($b_0$), without recursion, to $b_1, b_2, \ldots, b_k$, and obtain $r_i$, for $i=1, \ldots, k$, where $r_i$ is the probability that control passes from $b_0$ to $b_i$. From this, one finds:

$$b\text{freq}(b_0) = in\_\text{freq}(b_0) + \sum_{i=1}^{k} \text{freq}(b_i \to b_0)$$

$$= in\_\text{freq}(b_0) + \sum_{i=1}^{k} (b\text{freq}(b_i) \times \text{prob}(b_i \to b_0))$$

$$= in\_\text{freq}(b_0) + \sum_{i=1}^{k} (b\text{freq}(b_0) \times r_i \times \text{prob}(b_i \to b_0))$$

$$= in\_\text{freq}(b_0) + b\text{freq}(b_0) \sum_{i=1}^{k} (r_i \times \text{prob}(b_i \to b_0))$$

Let $$P_i = r_i \times \text{prob}(b_i \to b_0)$$

$$cp(b_0) = \sum_{i=1}^{k} (r_i \times \text{prob}(b_i \to b_0)) = \sum_{i=1}^{k} P_i,$$

and if $0 \leq cp(b_0) < 1$, one has:
$$b\text{freq}(b_0) = in\_\text{freq}(b_0) + b\text{freq}(b_0) \times cp(b_0)$$

$$= \frac{in\_\text{freq}(b_0)}{1 - cp(b_0)}$$

In this derivation, $p_i$ is the probability that control goes from $b_0$ to $b_0$ through block $b_i$, and $cp(b_0)$ is the probability along all paths that control goes from $b_0$ to $b_0$. This $cp(b_0)$ is called the cyclic probability of block $b_0$. To find the cyclic probability, first assume $b_0$ executes once and propagate branch probabilities from $b_0$ to all back edges leading to $b_0$, and sum the probabilities of the back edges.

Figure 5B:
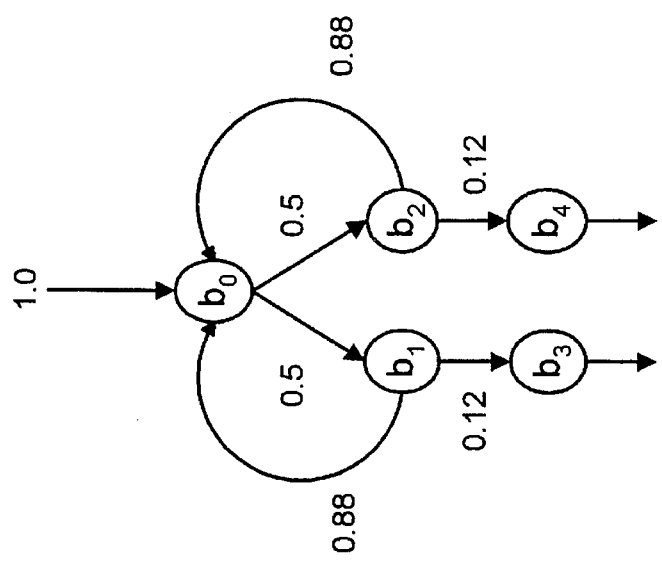
Figure 5A:
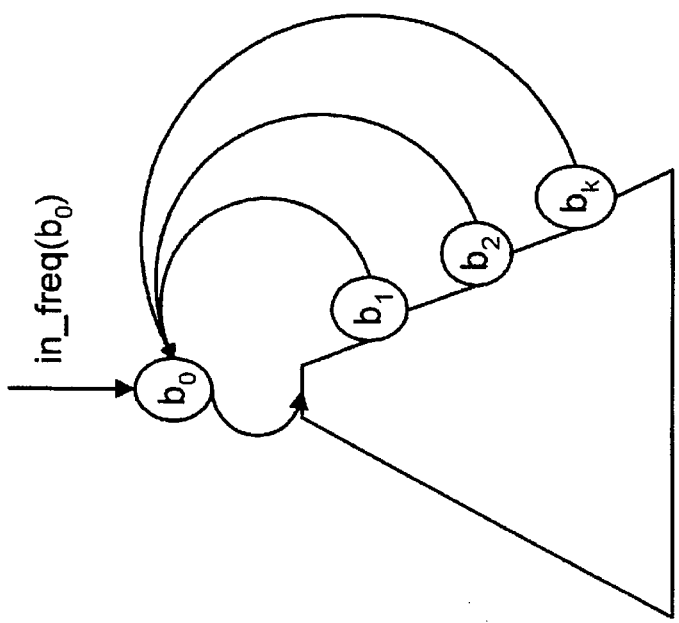

Applying this formula to the examples in FIGS. A–C, one gets:

$$b\text{freq}(b_0) = \frac{1}{1 - 0.5 \times 0.88 - 0.5 \times 0.88} = 8.33$$

for the flow graph in FIG. 5B, and:

$$b\text{freq}(b_0) = \frac{1}{1 - 0.88 - 0.88 \times 0.12 - 0.88 \times 0.12 \times 0.12} = 578.70$$

for the flow graph in FIG. 5C.

For a loop that terminates, $cp(b_0)<1$. If the loop appears not to terminate, one could have $cp(b_0) \leq 1$. When this happens, $cp(b_0)$ can be easily set to a value (less than 1) that represents the cyclic probability for spin loops.

Figure 6:
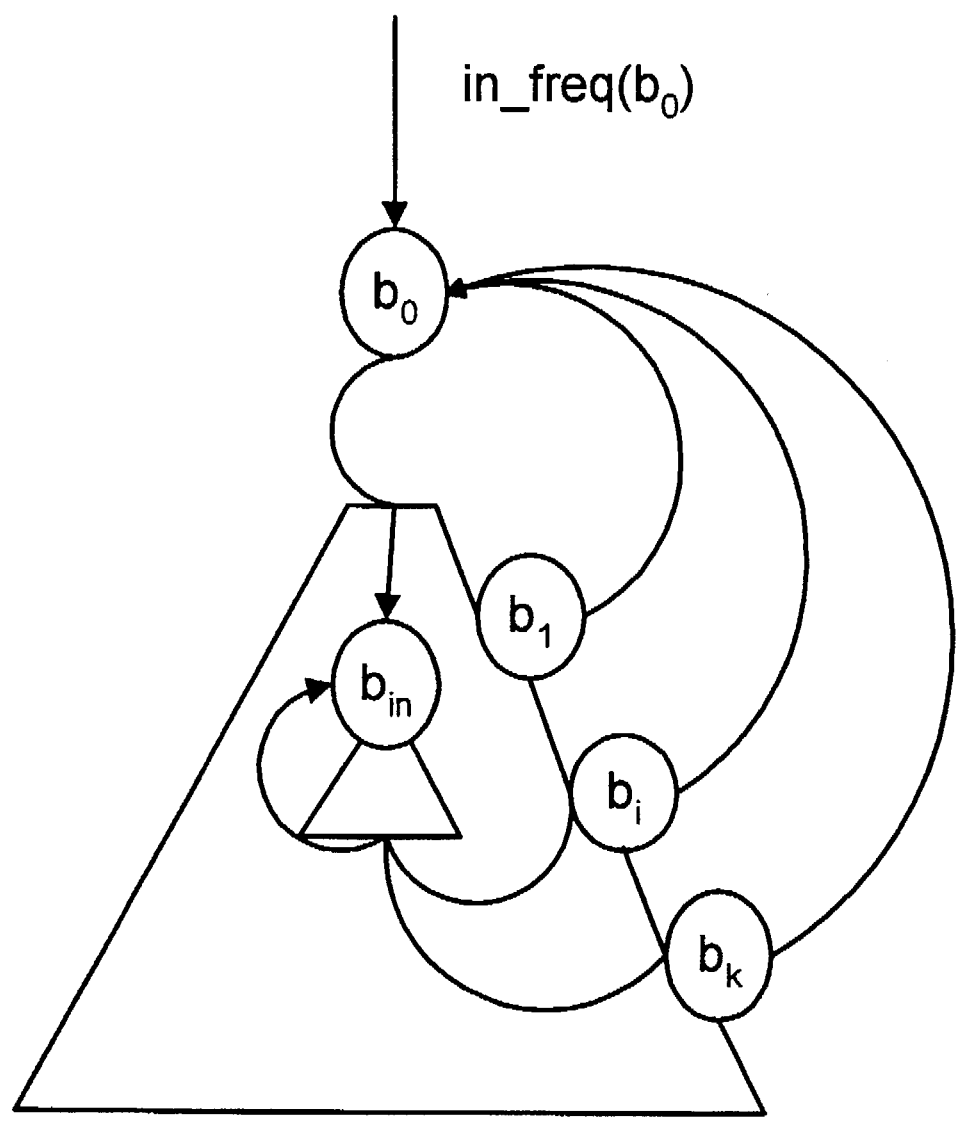
FIG. 6 is another example control flow graph of a procedure.

Now consider in FIG. 6 a procedure's flow graph with two loop heads, one of which is nested in the other. For this flow graph, one first finds the cyclic probability of the inner loop and then treat the outer loop the same manner as a single-level loop, except that one uses the formula $$b\text{freq}(b_{inner}) = \frac{in\_\text{freq}(b_{inner})}{1 - cp(b_{inner})}$$

to find the frequency of the inner loop head, where $b_{inner}$ is the head block of the inner loop structure and $cp(b_{inner})$ is $b_{inner}$'s cyclic probability.

If a flow graph is reducible, every loop head dominates the blocks in the loop. The method described above finds the correct branch frequencies for these flow graphs. The innermost loop is visited first and the cyclic probabilities of inner loops are used to compute frequencies for the outer loops.

The algorithm described above computes branch and block frequencies for a procedure. Pseudocode representing the steps taken by compiler 50 for executing the algorithm is contained in Table 3 below. It assumes that the flow graph is reducible. The algorithm also terminates for non-reducible flow graphs, although the resulting estimates may be less accurate.

TABLE 3

Input: Control-flow graph G for function, in which each node is a basic block and each edge $b_i \to b_j$ represents a branch from block $b_i$ to block $b_j$. Each edge $b_i \to b_j$ has branch probability prob ($b_i \to b_j$).
Output: Assignments of frequency freq ($b_i \to b_j$) to edge $b_i \to b_j$ and bfreq (b) to block b.
Subroutine: propagate_freq (b, head)
    if b has been visited then
        return;
    // 1. find bfreq (b)
    if b == head then
        bfreq (b) = 1;
    else
        foreach predecessor $b_p$ of b do
        if $b_p$ is not visited and ($b_p \to b$) is not a back edge then
            return;
        bfreq (b) = 0;
        cyclic_probability = 0;
        foreach predecessor $b_p$ of b do
            if ($b_p \to b$) is back edge to loop head b then
                cyclic_probability += back_edge_prob ($b_p \to b$);
            else
                bfreq (b) = += freq ($b_p \to b$);
        if (cyclic_probability > 1 − epsilon) then
            cyclic_probability = 1 − epsilon;

$$b\text{freq}(b) = \frac{b\text{freq}(b)}{1 - \text{cyclic\_probability}}$$

// 2. calculate the frequencies of b's out edges
    mark b as visited
    foreach sucessor $b_j$ of b do
        freq ($b \to b_i$) = prob ($b \to b_i$) × bfreq (b);
        // update back_edge_prob ($b \to b_i$) so it
        // can be used by outer loops to calculate
        // cyclic_probability of inner loops
        if $b_i$ == head then
            back_edge_prob ($b \to b_i$) = prob ($b \to b_i$) × bfreq (b);
    // 3. propagate to successor blocks
    foreach successor $b_i$ of b do
        if ($b \to b_i$) is not back edge then
            propagate freq ($b_i$, head);
Process:
    foreach edge do
        back_edge_prob (edge) = prob (edge);
    foreach loop from inner-most to out-most do
        let head be the head block of the loop
        mark all blocks reachable from head as not visited
        and mark all other blocks as visted.
        propagate_freq (head, head);

The block and branch frequencies, which are derived from the branch probabilities as described above, are then stored by compiler 50 in a fields 70b and 70e, respectively, of the basic block data structure 70 in memory system 30.

Figure 7:
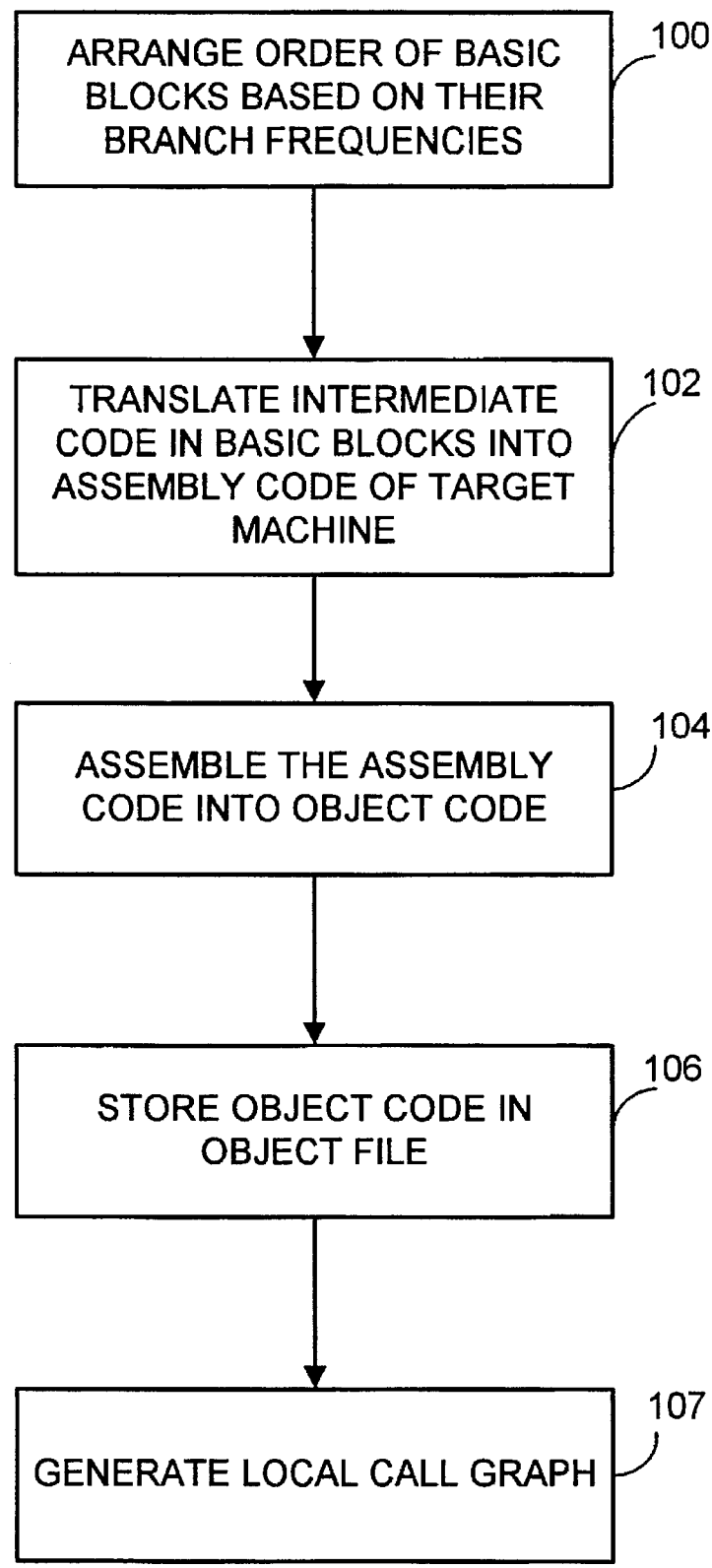
FIG. 7 is a flowchart showing the steps for storing the object code in an order based on branch frequencies.

Optimization with Branch Probabilities, Block Frequencies and Branch Frequencies Referring again to FIG. 2, one optimization of the object code is carried out by code generator 64 of the compiler, which generates the object code from the intermediate code for storage in an object file 94. FIG. 7 is a flowchart of the steps taken by code generator 64 to optimize the object code. Initially the code generator reorders the basic blocks of a function (100). This is determined from the branch frequencies information in data structure fields 70e. For example, with respect to FIG. 3, basic block B2 has branches to blocks B4 and B5. Each of these branches has a frequency, stored in field 70e. If the frequency of the branch between B2 and B4 is greater than the frequency of the branch between B2 and B5, then the basic blocks may be rearranged to take advantage of this frequency. One possible arrangement is to place block B4 adjacent to block B2. Then, if the CPU running the program prefetches instructions, it will prefetch the instruction of block B4, which most likely follow the instructions of block B2. Once arranged, the intermediate code is translated into assembly code that runs on the target machine 20 (102). The assembly code is assembled into object code (104). Of course, the intermediate code may be translated directly into object code if the compiler is capable of doing so. The object code is then stored on object file 94 (106). The code generator also generates a local call graph 96 for functions in the program from the intermediate code and the block frequency information (107).

Computing Function Call Frequencies and Invocation Frequencies

Figure 8:
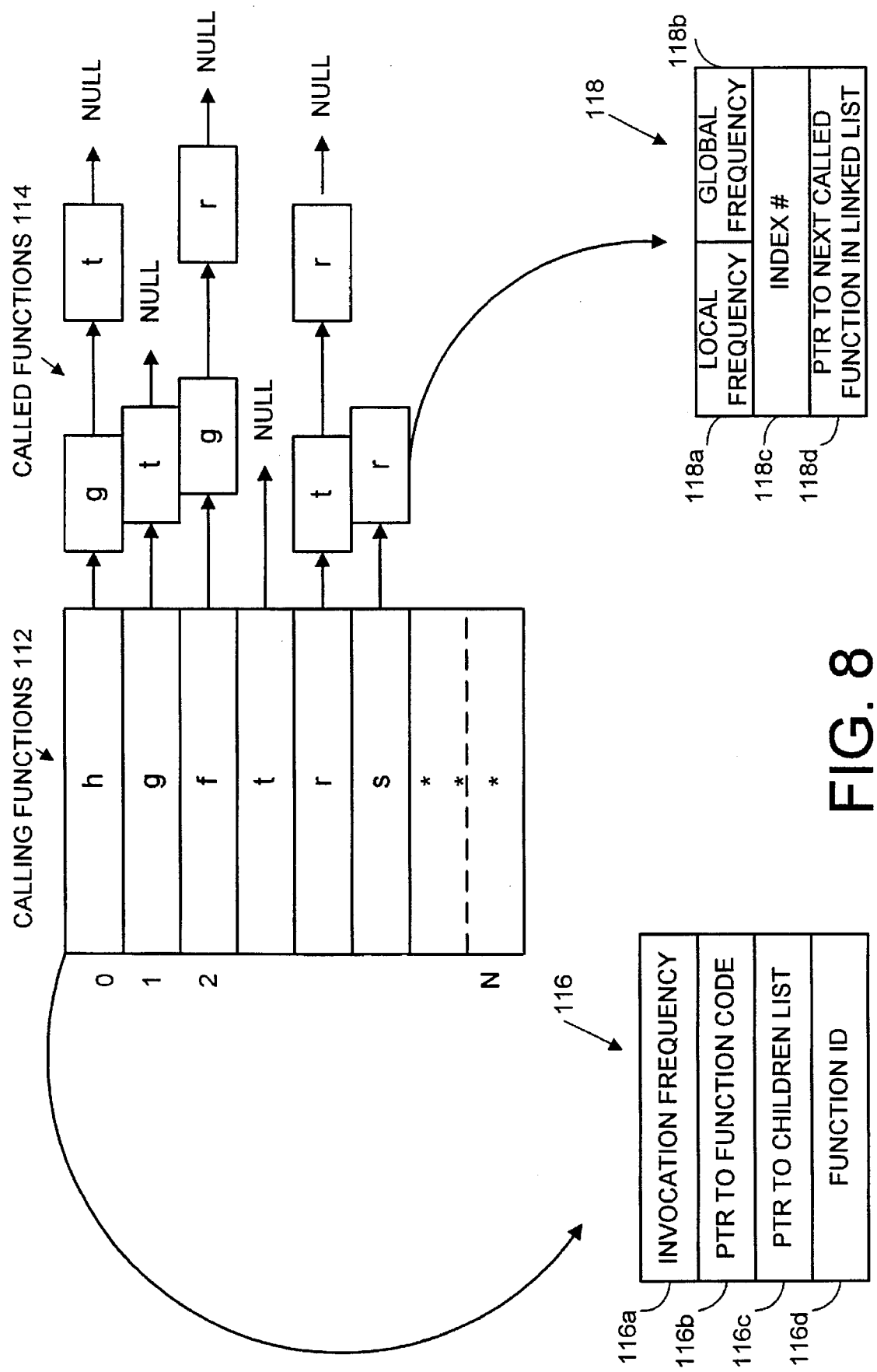
FIG. 8 is a data structure diagram of a call graph of the functions within a program.

Referring again to FIG. 2, the object files for the various functions of a program are linked together and possibly with other files such as libraries. Any external references are resolved. As part of the linking, a linker 108 fills a data structure 110 contained in memory from information in object code file 94 and local call graph 96. The data structure comprises a global call graph with function call frequencies. Data structure 110 is shown in more detail in FIG. 8. It includes an array 112 of the program's functions whose elements each point to a linked list 114 of called functions. Each element of the array 112 has the structure indicated at 116. Data structure 116 includes a field 116a that contains the function's invocation frequency (how often it is called); a field 116b that contains a pointer to the function's code; a field 116c that contains a pointer to a list of children (functions called by this function) and a field 116d that contains the function's ID. The elements of linked list 114 are data structures such as indicated at 118. Data structure 118 includes a field 118a that contains the local call frequency for the function; a field 118b that contains a global call frequency for the function; a field 118c containing an index number identifying the structure as an element in the array 112; and a field 118d containing a pointer to the next called function in the linked list. The end of the list is indicated by a null value in field 118d.

The data stored in data structure 110 is used by linker 108 to order the functions of the program. The local block frequencies are used for calculating the local frequency of calls on other functions. These local call frequencies are then propagated along call-graph edges to compute interprocedural (or global) function invocation frequencies and call frequencies. Finally, global basic block and edge frequencies may be obtained by multiplying each local frequency by its function's global invocation frequency.

The local call frequency is the number of times that a function f calls a function g, assuming one invocation of f. This information is readily available from the function's block frequencies, computed previously. If function f calls g in blocks $b_1, \ldots b_k$ of function f, the local call frequency of f calling g is the combination of the frequencies of these blocks, such as by summing. The invocation frequency of a function f is the frequency with which function f itself is called during the execution of the program. The global call frequency of function f calling g is then the number of times that f calls g during all invocations of f, which is a combination of the local call frequency and the invocation frequency of f. The combination in the preferred embodiment is the product of the local call frequency and the invocation frequency. It should be understood that function f may call a number of functions such as g, h, i, etc., with function g described above being an example.

Computing global call frequencies from local call frequencies is similar to propagating branch probabilities in a flow graph. Assume cfreq(f) is the number of times that function f is called, lfreq(f,g) is the local frequency of f calling g, and gfreq(f,g) is the global frequency of f calling g. The flow equations relating local and global call frequencies are:

| | | | |
|---|---|---|---|
| cfreq(f) | = | 1 | (f is main function) |
| cfreq(f) | = | Σfreq(p,f) pepred(f) | (otherwise) |
| gfreq(f,g) | = | lfreq(f,g) × cfreq(f) | |

A call graph is not reducible when a recursive cycle in the graph can be entered at several points. To handle these cycles, the branch and block frequency computation algorithm in Table 3 is modified. Each node that is the target of a back edge is treated as a loop head and, when calculating the cyclic probability for a loop head that is not the entry function, not using its descendants' cyclic probabilities.

Table 4 below contains pseudocode describing an algorithm executed by linker 108 for calculating global call and function invocation frequencies.

TABLE 4

Input: A call graph, each node of which is a procedure and each edge $f_i \rightarrow f_j$ represents a call from function $f_i$ to $f_j$. Edge $f_i \rightarrow f_j$ has local call frequency lfreq ($f_i \rightarrow f_j$).
Output: Assignments of global function call frequency gfreq ($f_i \rightarrow f_j$) to edge $f_i \rightarrow f_j$ and invocation frequency cfreq (f) to f.
Subroutine: propagate_call_freq (f, head, final)
    if f has been visited then
        return;
    // 1. find cfreq (f)
    foreach predecessor fp of f do
        if fp is not visited and (fp →f) is not a back edge then
            return;
    if f == head then
        cfreq (f) = 1;
    else
        cfreq (f) = 0;
    cyclic_probability = 0;
    foreach predecessor fp of f do
        if final and (fp→f) is a back edge then
            cyclic_probability += back_edge_prob (fp→f);
        else if (fp→f) is not a back edge
            cfreq (f) += gfreq (fp→f);
    if (cyclic_probability > 1 − epsilon) then
        cyclic_probability = 1 − epsilon;

$$\text{cfreq}(f) = \frac{\text{cfreq}(f)}{1 - \text{cyclic\_probability}}$$

// 2. calculate global call frequencies for f's out edges
    mark f as visited;
    foreach successor fi of f do
        gfreq (f→fi) = lfreq (f→fi) × cfreq (f);
        // update back_edge_prob (f→fi) so it can be
        // used by the outer-most loop to calculate
        // cyclic_probability of inner loops
        if fi == head and not final then
            back_edge_prob (f→fi) = lfreq (f→fi) × cfreq (f);
    // 3. propagate to successor nodes
    foreach successor fi of f do
        if (f→fi) is not a back edge then
            propagate_call_freq (fi, head, final)
Process:
    foreach edge do
        back_edge_prob (edge) = lfreq (edge);
    foreach function f in reverse depth-first order do
        if f is a loop head then
            mark all nodes reachable from f as not visited TABLE 4-continued and all other as visited.
propagate_call_freq (f, f, false)
mark all nodes reachable from entry func as not
visited and others as visited.
propagate_call_freq (entry func, entry func, true)

Optimization with Function Frequencies

Other optimizations of the program may be performed by ordering functions within the object code to improve memory reference locality, a process performed by linker 108 as shown at 122 in FIG. 2. Typically a machine with virtual memory has its memory system organized as pages, with the main memory 38 holding several virtual pages and secondary storage 40 such as disk storing other virtual pages. Each page represents part or all of an executing program. If an executing program must call a function not contained in the memory pages, a page fault results and the target machine must bring a page from secondary storage that contains the called function into a memory page. This considerably slows the execution of the program. However, with the computed function call frequencies, the function can be ordered so that pairs f,g with higher global call frequencies are identified and stored in an order to improve the likelihood that they will be within the same memory page when loaded into main memory. More function calls are thus made to functions stored in main memory 38 rather than to functions stored in secondary storage 40, increasing the speed of program execution.

The optimized object code produced by ordering the functions is then stored in an executable file 124.

An Example

Figure 9:
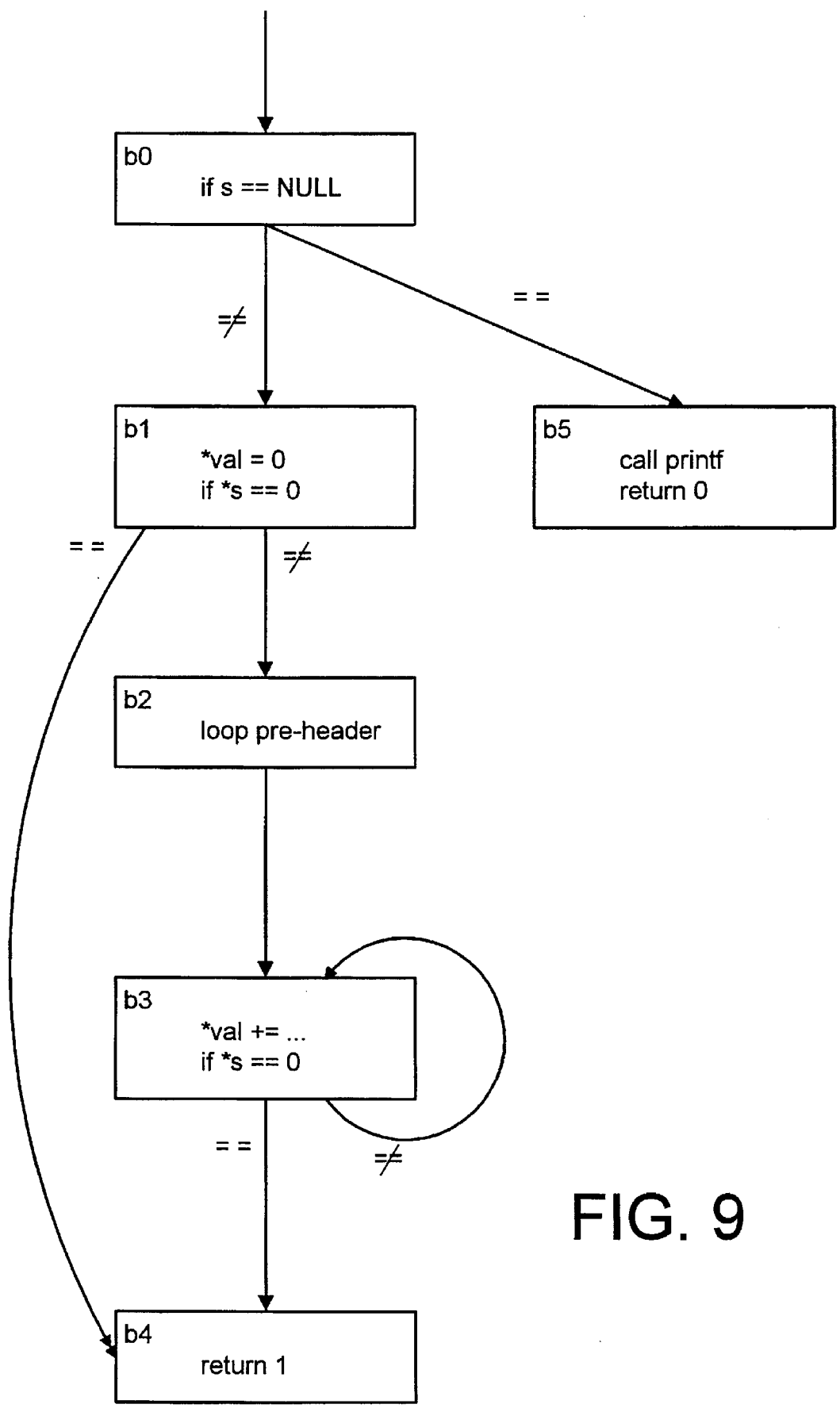
FIG. 9 is an example control flow graph.

The calculation of branch probabilities, branch and block frequencies and function invocation and call frequencies for optimizing a program is illustrated by the following example. Consider the atoi function in Table 5. FIG. 9 shows its flow graph. It contains two non-loop branches and one loop branch. Five heuristics apply to the first non-loop branch $b_0 \rightarrow \{b_1, b_5\}$, because $b_0$ performs a comparison of a pointer with NULL (PH), $b_1$ uses s without first defining it (GH) and stores to *val (SH), and b5 contains a call (CH) and a return (RH). Table 6 contains the heuristic probabilities. The combined probability of 0.95 for $b_0 \rightarrow b_1$ is much higher than the probability estimated by any of the five heuristics.

For the second non-loop branch $b_1 \rightarrow \{b_2, b_4\}$, both the Loop Header (LHH) and Return heuristics (RH) apply. Table 7 summarizes the probabilities.

TABLE 5

```
/*      permutation program: find
        all the permutations for {1, 2, . . . max} */
        main(argc, argv)
        int argc;
        char *argv[];
{
        int max;
        char *a;
        atoi(argv[1], &max);
        a = (char *) malloc(max);
        permute(a,0,max);
}
permute(a,n,max)
        char *a;
        int n,max;
{
        if (n == max)
                report_one(a,max);
        else
                permute_next_pos (a,n,max);
}
permute_next_pos(a,n,max)
        char *a;
        int n,max;
{
        int: i;
        for (i=0;i < max;i++) {
                if ( ! in_prefix(i, a, n) ){
                        a[n] = i;
                        permute(a,n+1 ,max);
                }       }       }
report_one(a,max)
        char *a;
        int max;
{
        int i;
        for (i=0;i < max;i++)
                printf("%c ", a[i]+'0');
        putchar('\n');
}
int in_prefix(i, a, n)
        char *a;
        int i, n;
{
        int found = 0,j;
        for (j=0;j < n;j++)
                if (a[j] == i) {
                        return 1;
                }
        return 0;
}
int atoi ( char *s, int *val)
{
        int i;
        if ( s != 0 ) {
                *val = 0;
                for ( ; *s; s++)
                        *val = *val * 10 + *s - '0';
                return 1;
        } else {
                printf ("Invalid Input!\n*");
                return 0;
        }   }
```

TABLE 6

| Heuristic | $b_0 \rightarrow b_1$ | $b_0 \rightarrow b_5$ |
| --- | --- | --- |
| CH | .78 | .22 |
| RH | .72 | .28 |
| SH | .45 | .55 |
| PH | .60 | .40 |
| GH | .62 | .38 |
| Combined | .95 | .05 |

TABLE 7

| Heuristic | $b_1 \rightarrow b_2$ | $b_1 \rightarrow b_4$ |
| --- | --- | --- |
| LHH | .75 | .25 |
| RH | .72 | .28 |
| Combined | .88 | .12 |

The branch $b_3 \rightarrow \{b_3, b_4\}$ contains a back edge, and only the loop branch heuristic (LBH) applies, so:

prob($b_3 \rightarrow b_3$)=LBH($b_3 \rightarrow b_3$)=0.88
prob($b_3 \rightarrow b_4$)=LBH($b_3 \rightarrow b_4$)=0.12

Figure 10:
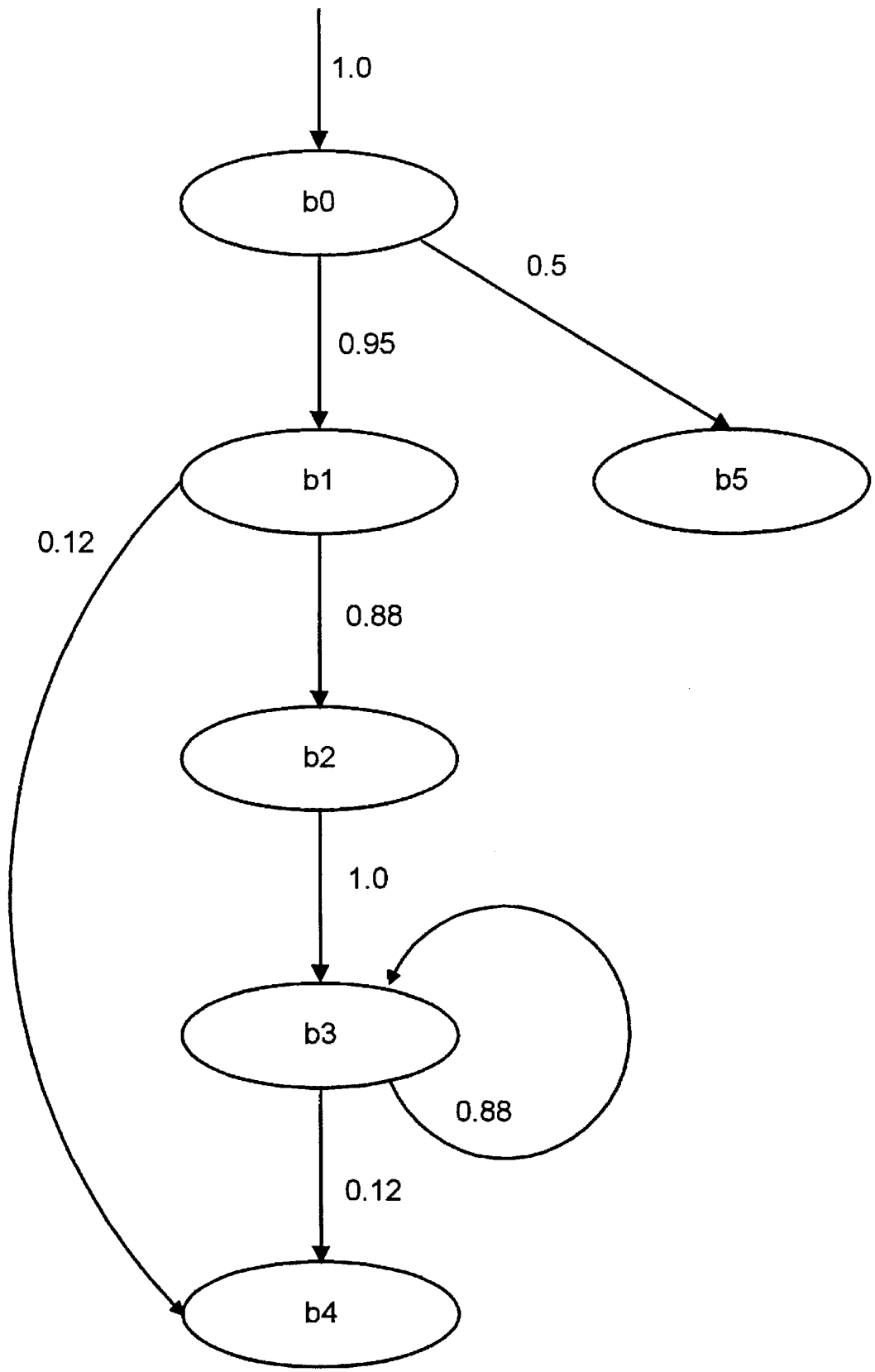
FIG. 10 is the example control flow graph with branch probabilities added.

FIG. 10 shows the atoi flow graph labeled with each edge's branch probabilities. For the inner loop ($b_3 \rightarrow b_3$) the cyclic probability is the same as prob($b_3 \rightarrow b_3$). For the outer loop, the block frequencies and edge frequencies for the atoi function are calculated as follows:

$$bfreq(b_0) = 1$$
$$freq(b_0 \rightarrow b_1) = prob(b_0 \rightarrow b_1) \times 1 = 0.95$$
$$freq(b_0 \rightarrow b_5) = prob(b_0 \rightarrow b_5) \times 1 = 0.05$$
$$freq(b_1) = freq(b_0 \rightarrow b_1) = 0.95$$
$$freq(b_1 \rightarrow b_2) = prob(b_1 \rightarrow b_2) \times b$$
$$freq(b_1) = 0.89 \times 0.95 = 0.84$$
$$freq(b_1 \rightarrow b_4) = prob(b_1 \rightarrow b_4) \times b$$
$$freq(b_1) = 0.12 \times 0.95 = 0.11$$
$$freq(b_2) = freq(b_1 \rightarrow b_2) = 0.84$$

$$bfreq(b_3) = \frac{freq(b_2 \rightarrow b_3)}{1 - prob(b_3 \rightarrow b_3)} = \frac{0.84}{1 - 0.88} = 6.99$$

$$freq(b_2 \rightarrow b_3) = prob(b_2 \rightarrow b_3) \times bfreq(b2) = 1 \times 0.84$$
$$freq(b_3 \rightarrow b_3) = bfreq(b_3) \times 0.84 = 6.15$$
$$freq(b_3 \rightarrow b_4) = bfreq(b_3) \times 0.12 = 0.84$$
$$bfreq(b_4) = freq(b_1 \rightarrow b_4) + freq(b_3 \rightarrow b_4) = 0.11 + 0.84 = 0.95$$
$$bfreq(b_5) = freq(b_0 \rightarrow b_5) = 0.05$$

Figure 11:
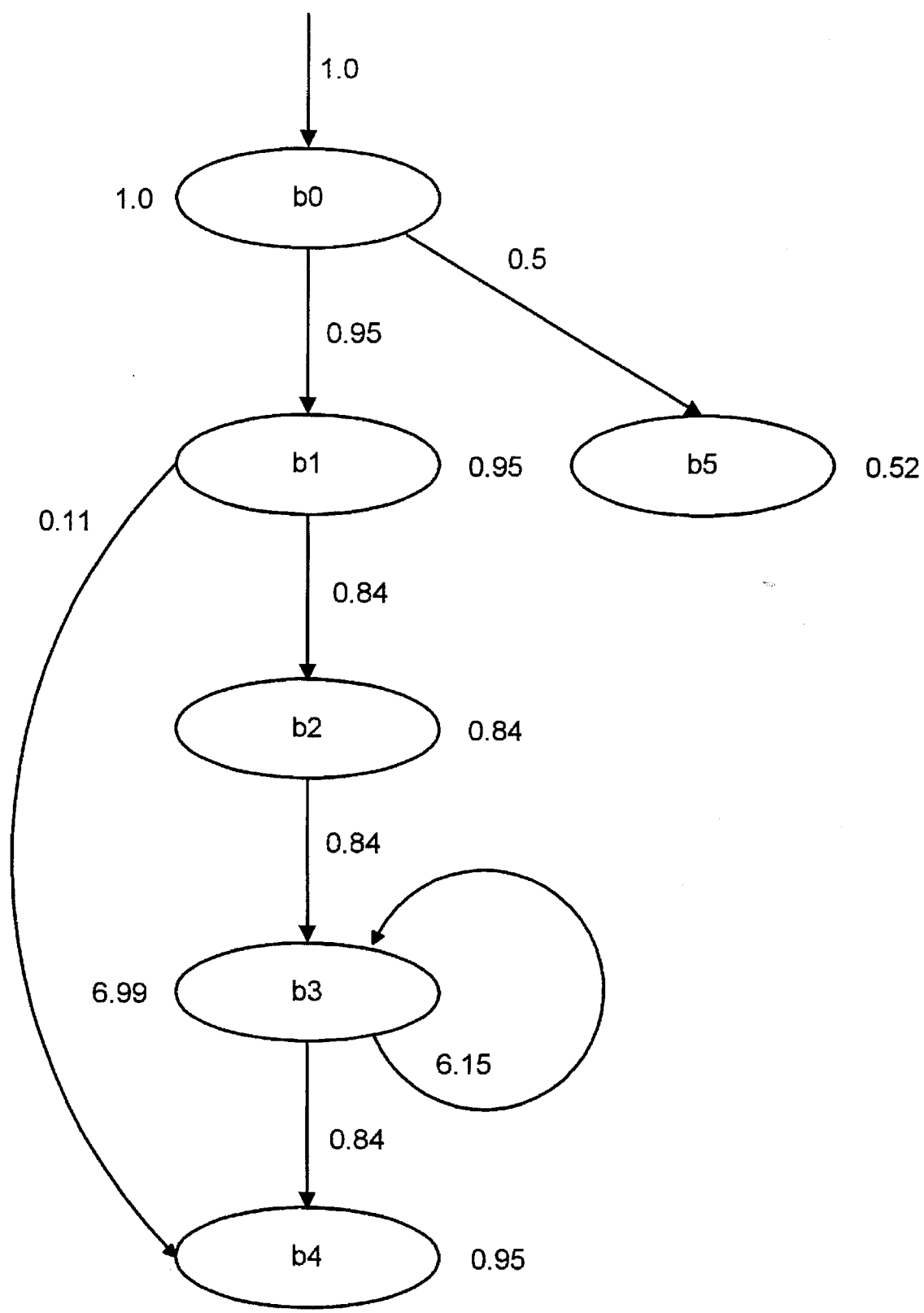
FIG. 11 is the example control flow graph with block and branch frequencies added.

FIG. 11 shows the block and edge frequencies. Note that because one starts the entry block with a frequency of one, the exit blocks' total frequency is also one. That is, freq $(b_0 \rightarrow b_5)$+freq$(b_1 \rightarrow b_4)$+freq$(b_3 \rightarrow b_4)$=0.05+0.11+0.84=1

The atoi function calls printf in block $b_5$ and block $b_5$'s frequency is 0.05. So, in the call graph, atoi calls printf with a local frequency of 0.05. This process is continued to find the local call frequencies for the permutation program, shown in FIG. 12A.

Figure 12A:
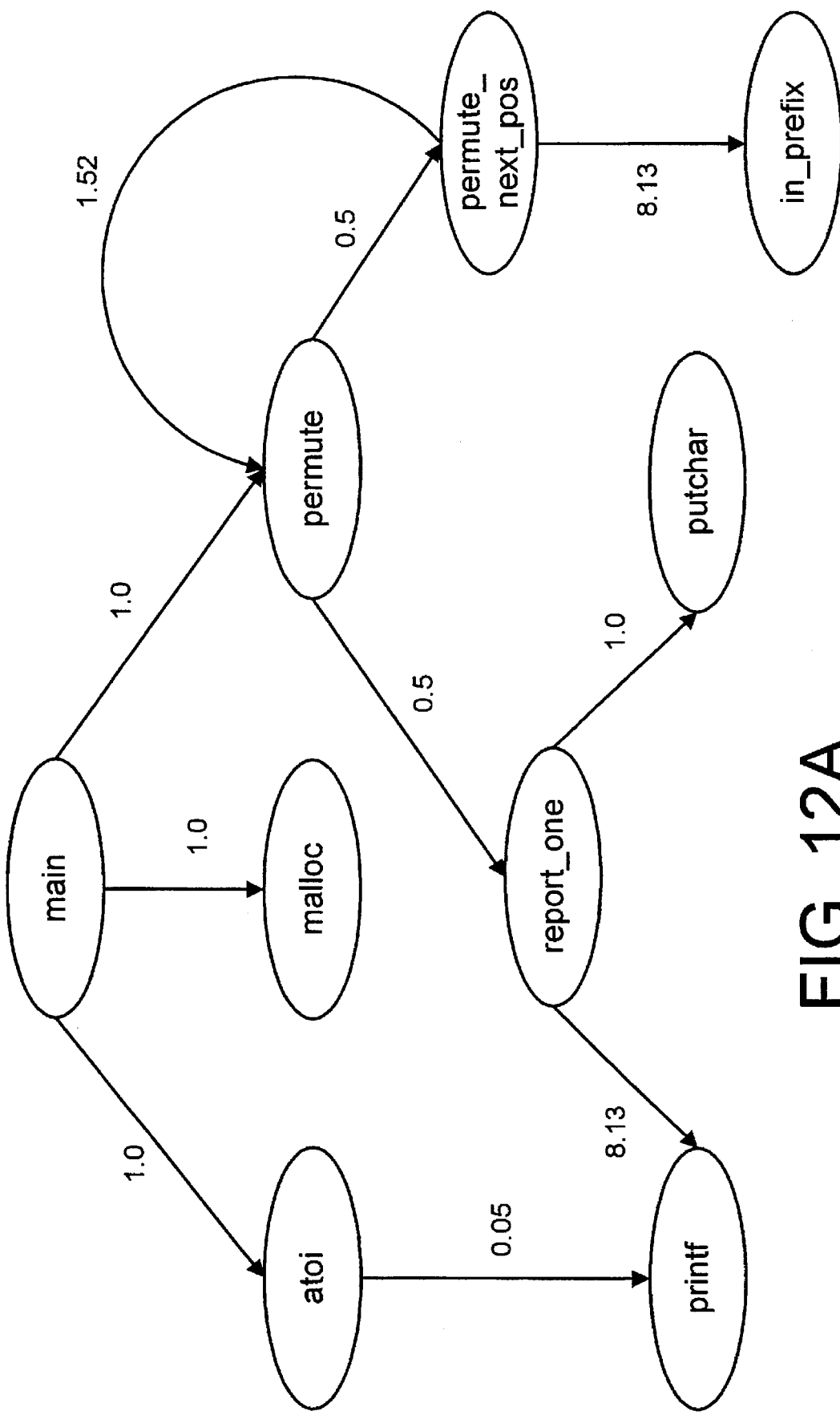
FIG. 12A is an example call graph showing local call frequencies.
Figure 12B:
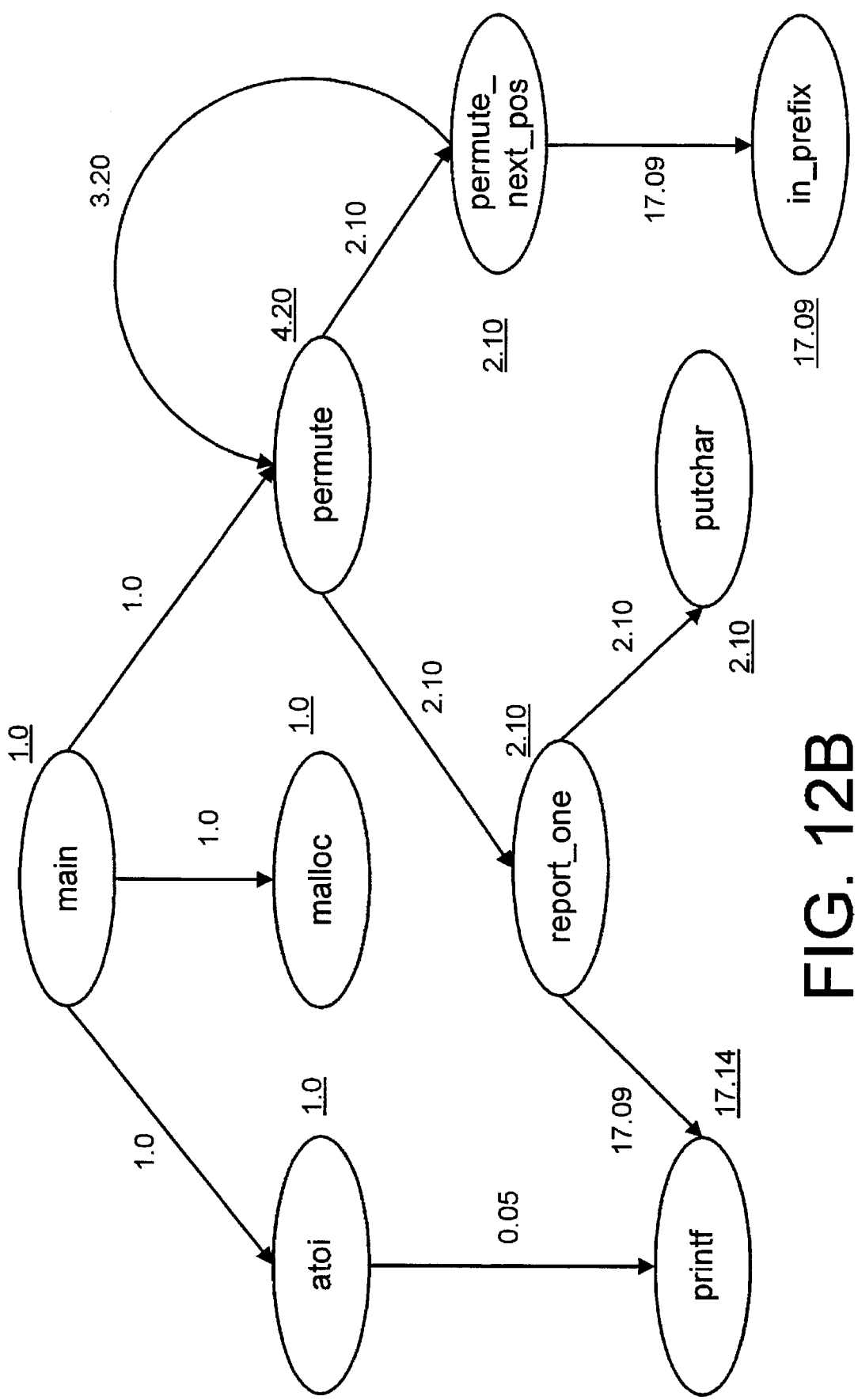
FIG. 12B is the example call graph showing global call frequencies and invocation frequencies.

As shown in FIG. 12A, the permutation program of Table 5 has a recursive cycle in which the permute function is the head. The first call to propagate_call_freq updates lfreq (permute_next_pos→permute) from 1.52 to 0.5×1.52= 0.76. In the final call to propagate_call_freq, the global call frequency and invocation frequencies for the various functions are obtained. They are shown in FIG. 12B. The (report_one, printf) function pair has the highest global call frequency and may have priority in ordering the functions.

Table 8 lists local branch frequencies in its third column, function invocation frequencies in its fourth column, and global branch frequencies in its fifth column.

TABLE 8

| functions | edges | local edge freq. | func. invoc. freq. | global edge freq. |
| --- | --- | --- | --- | --- |
| report_one | b0→b3 | .02 | 2.1 | .05 |
| report_one | b0→b5 | .98 | 2.1 | 2.1 |
| report_one | b1→b3 | .98 | 2.1 | 2.1 |
| report_one | b1→b1 | 7.2 | 2.1 | 15.0 |
| report_one | b5→b1 | .98 | 2.1 | 2.1 |
| in_prefix | b0→b5 | .02 | 17.1 | .41 |
| in_prefix | b0→b7 | .98 | 17.1 | 16.7 |
| in_prefix | b1→b2 | .29 | 17.1 | 4.9 |
| in_prefix | b1→b3 | 5.9 | 17.1 | 10.0 |
| in_prefix | b3→b5 | .70 | 17.1 | 12.0 |
| in_prefix | b3→b1 | 5.2 | 17.1 | 88.0 |
| in_prefix | b7→b1 | .98 | 17.1 | 16.7 |
| permute_next_pos | b0→b5 | .02 | 2.1 | 0.5 |
| permute_next_pos | b0→b7 | .98 | 2.1 | 2.1 |
| permute_next_pos | b1→b2 | 1.5 | 2.1 | 23.2 |
| permute_next_pos | b1→b3 | 6.6 | 2.1 | 13.9 |
| permute_next_pos | b2→b3 | 1.5 | 2.1 | 3.2 |
| permute_next_pos | b3→b5 | .98 | 2.1 | 2.1 |
| permute_next_pos | b3→b1 | 7.2 | 2.1 | 15.0 |
| permute_next_pos | b7→b1 | .98 | 2.1 | 2.1 |
| atoi | b0→b1 | .95 | 1.0 | .95 |
| atoi | b0→b5 | .05 | 1.0 | .05 |
| atoi | b1→b4 | .11 | 1.0 | .11 |
| atoi | b1→b2 | .84 | 1.0 | .84 |
| atoi | b2→b3 | .84 | 1.0 | .84 |

TABLE 8-continued

| functions | edges | local edge freq. | func. invoc. freq. | global edge freq. |
| --- | --- | --- | --- | --- |
| atoi | b3→b3 | 6.2 | 1.0 | 6.2 |
| atoi | b3→b4 | .84 | 1.0 | .84 |
| permute | b0→b1 | .50 | 4.2 | 2.1 |
| permute | b0→b2 | .50 | 4.20 | 2.1 |

Having illustrated and described the principles of the invention in a preferred embodiment, it should be apparent to those skilled in the art that the embodiment can be modified in arrangement and detail without departing from such principles. In view of the many possible embodiments to which the principles of our invention may be applied, it should be recognized that the illustrated embodiment is only a preferred example of the invention and should not be taken as a limitation on the scope of the invention. Rather, the invention is defined by the following claims. I therefore claim as our invention all that comes within the scope and spirit of these claims.

I claim:

1. A method of compiling a computer program, the method comprising the following steps:

associating probabilities with a plurality of heuristic predictions;

generating intermediate code from source code of the program;

partitioning the intermediate code into basic blocks;

storing the basic blocks in a basic block data structure including the intermediate code and a branch to other basic blocks;

for a branch:
  determining which heuristic predictions apply to the branch; and
  if more than one heuristic prediction applies, combining the associated probabilities of at least two heuristic predictions that apply to compute a probability of the branch being taken by the program;

storing the branch probabilities;

generating object code from the intermediate code; and storing the object code in an order based on the branch probabilities.

2. The method of claim 1 wherein the step of storing the object code comprises:

computing branch frequencies from the branch probabilities; and storing the object code in an order based on the branch frequencies.

3. The method of claim 2 wherein the step of computing branch frequencies from branch probabilities comprises:

determining, from the branch probabilities, frequencies at which the basic blocks of intermediate code are executed;

for a branch, computing a branch frequency by combining the frequency of the basic block from which the branch is taken with the branch probability.

4. The method of claim 1 wherein functions of a program each comprise a group of basic blocks, the method including the following steps:

computing, from the branch probabilities, frequencies for the basic blocks of a function f;

combining the frequencies of basic blocks in the function f which include a call to a function g to obtain a local call frequency lfreq(f,g), the local call frequency being the frequency with which the calling function f calls function g assuming one invocation of function f;

determining a function invocation frequency cfreq(f), the function invocation frequency being the frequency with which the function f is itself called in the program;

combining the function invocation frequency with the local call frequency to obtain a global call frequency gfreq(f,g) for each function pair f and g; and storing the functions of the program in an order based on their global call frequencies.

5. The method of claim 1 wherein the step of storing the object code in an order based on the branch probabilities comprises storing the object code such that instructions following a branch with a higher branch probability are stored close to instructions preceding the branch.

6. The method of claim 1 wherein the steps of generating and storing the object code comprise:

computing branch frequencies from the branch probabilities;

storing the branch frequencies;

storing the basic blocks of intermediate code in an order based on the branch frequencies;

generating object code from the ordered intermediate code; and storing the object code.

7. The method of claim 1 wherein the combining step comprises combining the associated probabilities of at least two heuristic predictions according to the following:

$$m_1 \oplus m_2(B) = \frac{\sum_{allX,Y} m_1(X)m_2(Y)}{\sum_{allU,W} m_1(U)m_2(W)}$$

wherein m1 and m2 are basic probability assignments of heuristics, A is a set of possible branching target blocks, B is a subset of A, X and Y are subsets of A whose intersection is B, and U and W are subsets of A with at least one element in common.

8. The method of claim 1 wherein the branch is one of two possible branches and the combining step comprises combining the associated probabilities of two heuristic predictions according to the following:

probability of branch $b = u*v/(u*v+(1-u)(1-v))$ where u and v are b's taken probabilities of two heuristic predictions that apply to the branch.

9. The method of claim 1 wherein each of the heuristic predictions is one of a loop branch heuristic, pointer heuristic, opcode heuristic, guard heuristic, loop exit heuristic, loop header heuristic, call heuristic, store heuristic and return heuristic.

10. The method of claim 1 including determining the probabilities of the heuristic predictions from a run time measurement of a set of computer programs.

11. The method of claim 1 in which the basic block data structure comprises a field containing the intermediate code, a field for a basic block frequency, a field for each branch to other basic blocks, and, for an indicated branch, a field for branch frequency and field for branch probability.

12. A computer-readable medium on which is stored a computer program comprising instruction for executing the method of claim 1.

13. A method of compiling a computer program, the method comprising the following steps:

generating intermediate code from source code of the program;

partitioning the intermediate code into basic blocks;

storing the basic blocks in a basic block data structure including intermediate code and a branch to other basic blocks;

computing for the branches a probability that a branch is taken;

for a block that is a loop head, determining a block frequency bfreq($b_0$) by computing a cyclic probability cp($b_0$) for the block and computing the block frequency according to the following:

bfreq($b_0$)=in_freq($b_0$)/(1−cp)($b_0$)) where in_freq($b_0$) is a sum of branch frequencies into block $b_0$ from non-loop branches;

for a block that is not a loop head, determining a block frequency bfreq($b_i$) by summing branch frequencies into the block;

computing branch frequencies by combining the frequency of a basic block from which the branch is taken with the branch probability;

generating object code from the intermediate code; and storing the object code in an order based on the branch frequencies.

14. The method of claim 13 wherein functions of a program each comprise a group of the basic blocks, the method including the following steps:

computing block frequencies for the basic blocks of a function f;

combining the frequencies of basic blocks in the function f which include a call to a function g to obtain a local call frequency lfreq(f,g), the local call frequency being the frequency with which the calling function f calls function g assuming one invocation of function f;

determining a function invocation frequency cfreq(f), the function invocation frequency being the frequency with which the function f is itself called in the program;

combining the function invocation frequency with the local call frequency for each called function to obtain a global call frequency gfreq(f,g) for each function pair f and g; and storing the functions of the program in an order based on their global call frequencies.

15. The method of claim 14 wherein the storing step comprises storing the functions of the program such that function pairs with a higher global call frequency are stored within a same virtual memory page.

16. A computer-readable medium on which is stored a computer program comprising instruction for executing the method of claim 13.

17. An apparatus for compiling a computer program, comprising:

a stored table of probabilities associated with a plurality of heuristic predictions;

a compiler front end for generating intermediate code from source code of the program;

a code analyzer for partitioning the intermediate code into basic blocks;

a plurality of basic block data structures contained in memory, the data structures each including intermediate code of a basic block and a branch to other basic blocks;

a branch analyzer for determining which heuristic predictions apply to a branch and, if more than one heuristic prediction applies, combining the associated probabilities of at least two heuristic predictions that apply to compute a probability of the branch being taken by the program; and a code generator for generating object code from the intermediate code and for storing the object code in an order based on the branch probabilities.

18. The apparatus of claim 17 wherein the code generator generates assembly code from the intermediate code and includes an assembler for assembling the assembly code into binary object code.

19. The apparatus of claim 17 wherein the branch analyzer is constructed to compute branch frequencies from the branch probabilities, the object code stored in an order based on the computed branch frequencies.

20. The apparatus of claim 17 wherein the basic block data structure comprises a field containing the intermediate code, a field for a basic block frequency, a field for each branch to other basic blocks, and, for an indicated branch, a field for branch frequency and a field for branch probability.

21. An apparatus for compiling a computer program, comprising:

a compiler front end for generating intermediate code from source code of the program;

a code analyzer for partitioning the intermediate code into basic blocks;

a plurality of basic block data structures, a basic block data structure including intermediate code of a basic block and a branch to other basic blocks;

branch probabilities stored for the branches;

a branch analyzer for computing branch frequencies from the branch probabilities in the following manner:

for a block that is a lood head, determining a block frequency $bfreq(b_0)$ by computing a cyclic probability $cp(b_0)$ for the block and computing the block frequency according to the following: $bfreq(b_0)=in\_freq(b_0)/(1-cp)(b_0))$ where $in\_freq(b_0)$ is a sum of branch frequencies into block $b_0$ from non-loop branches;

for a block that is not a loop head, determining a block frequency $bfreq(b_i)$ by summing branch frequencies into the block;

computing branch frequencies by combining the frequency of a basic block from which the branch is taken with the branch probability;

a code generator for generating object code from the intermediate code; and means for storing the object code in an order based on the branch frequencies.

22. The apparatus of claim 21 including:

a data structure contained in memory for storing local call frequencies $lfreq(f,g)$, a local call frequency being the frequency with which a calling function f calls a function g within a single invocation of function f;

means for determining a function invocation frequency $cfreq(f)$, a function invocation frequency being the frequency with which a calling function f is itself called in the program;

means for combining the function invocation frequency with the local call frequency for each called function to obtain a global call frequency $gfreq(f,g)$ for each function pair f and g; and means for storing the functions of the program in an order based on their global call frequencies.

23. The apparatus of claim 22 wherein the data structure contains for functions in the program a field for the local call frequency, a field for the global call frequency and a field for the invocation frequency.

24. A computer-implemented method of predicting branch probability in the compiling of a computer program, the method comprising the following steps:

associating probabilities with a plurality of heuristic predictions;

identifying a branch in a program;

for a branch:

determining which heuristic predictions apply to the branch; and if more than one heuristic prediction applies, combining the associated probabilities of at least two heuristic predictions that apply to compute a probability of the branch being taken by the program.

25. The method of claim 24 wherein the associated probability for a heuristic prediction is derived from empirical data.

26. A computer-implemented method of determining branch frequencies for basic blocks in the compiling of a computer program, the method comprising the following steps:

identifying branches in a computer program;

computing for the branches a probability that a branch is taken;

for a block that is a loop head, determining a block frequency $bfreq(b_0)$ by computing a cyclic probability $cp(b_0)$ for the block and computing the block frequency according to the following:

$bfreq(b_0)=in\_freq(b_0)/(1-cp(b_0))$ where $in\_freq(b_0)$ is a sum of branch frequencies into block $b_0$ from non-loop branches;

for a block that is not a loop head, determining a block frequency $bfreq(b_i)$ by summing branch frequencies into the block; and computing branch frequencies by combining the frequency of a basic block from which the branch is taken with the branch probability.

* * * * *